US011324373B2

(12) United States Patent
Lee et al.

(10) Patent No.: US 11,324,373 B2
(45) Date of Patent: May 10, 2022

(54) CLEANING ROBOT AND METHOD FOR CONTROLLING SAME

(71) Applicant: Samsung Electronics Co., Ltd., Suwon-si (KR)

(72) Inventors: Byoung In Lee, Suwon-si (KR); Shin Kim, Hwaseong-si (KR); Byung Chan Kim, Yongin-si (KR); Woo Ram Oh, Suwon-si (KR); Kyung Han Jeong, Suwon-si (KR); Won Kyu Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 16/304,535

(22) PCT Filed: May 23, 2017

(86) PCT No.: PCT/KR2017/005310
§ 371 (c)(1),
(2) Date: Nov. 26, 2018

(87) PCT Pub. No.: WO2017/204514
PCT Pub. Date: Nov. 30, 2017

(65) Prior Publication Data
US 2021/0219803 A1    Jul. 22, 2021

(30) Foreign Application Priority Data

May 26, 2016   (KR) ......................... 10-2016-0064582

(51) Int. Cl.
*A47L 9/28*   (2006.01)

(52) U.S. Cl.
CPC ....... *A47L 9/2852* (2013.01); *A47L 2201/022* (2013.01); *A47L 2201/04* (2013.01); *A47L 2201/06* (2013.01)

(58) Field of Classification Search
None
See application file for complete search history.

(56) References Cited

U.S. PATENT DOCUMENTS

2012/0189507 A1   7/2012  Ko
2017/0215672 A1*  8/2017  Watanabe ............ G05D 1/0238

FOREIGN PATENT DOCUMENTS

EP    2 649 920 A1   10/2013
JP    2001-265437 A   9/2001
(Continued)

OTHER PUBLICATIONS

Machine translation for KR 954 (Year: 2009).*
(Continued)

*Primary Examiner* — Brian D Keller
(74) *Attorney, Agent, or Firm* — Jefferson IP Law, LLP

(57) ABSTRACT

Disclosed herein is a cleaning robot capable of allowing a driving apparatus to move along a cleaning apparatus when the cleaning apparatus is separated from the driving apparatus, and a controlling method thereof. In addition, a cleaning robot having a driving apparatus capable of storing a position from which a cleaning apparatus is separated when the cleaning apparatus is separated from the driving apparatus, and capable of moving to the stored position when the cleaning apparatus is mounted to the driving apparatus, and a controlling method thereof. The cleaning robot includes a driving apparatus provided with a mounting groove configured to allow a cleaning apparatus to be removably mounted, and the cleaning apparatus removably mounted to the mounting groove. When the cleaning apparatus is separated from the mounting groove, the driving apparatus stores a position of the driving apparatus upon the separation of the cleaning apparatus and when the cleaning
(Continued)

apparatus is mounted to the mounting groove, the driving apparatus moves to the stored position.

14 Claims, 28 Drawing Sheets

(56) References Cited

FOREIGN PATENT DOCUMENTS

| KR | 10-2010-0056905 A1 | 5/2010 |
|----|--------------------|--------|
| KR | 10-1208979 B1      | 12/2012 |
| KR | 10-1403954 B1      | 6/2014 |
| KR | 10-2014-0140755 A1 | 12/2014 |

OTHER PUBLICATIONS

Machine translation for KR 979 (Year: 2008).*
Extended European Search Report dated May 15, 2019, issued in European Patent Application No. 17803036.7.
European Office Action dated Jun. 9, 2020, issued in European Application No. 17803036.7-1016.

* cited by examiner

[Figure 1]
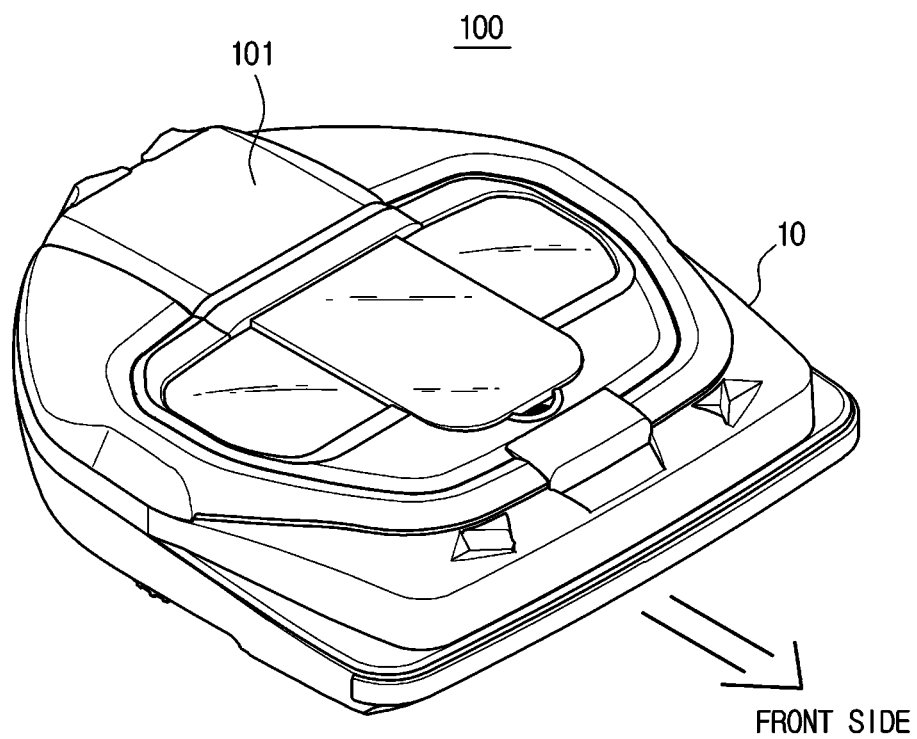

【Figure 2】
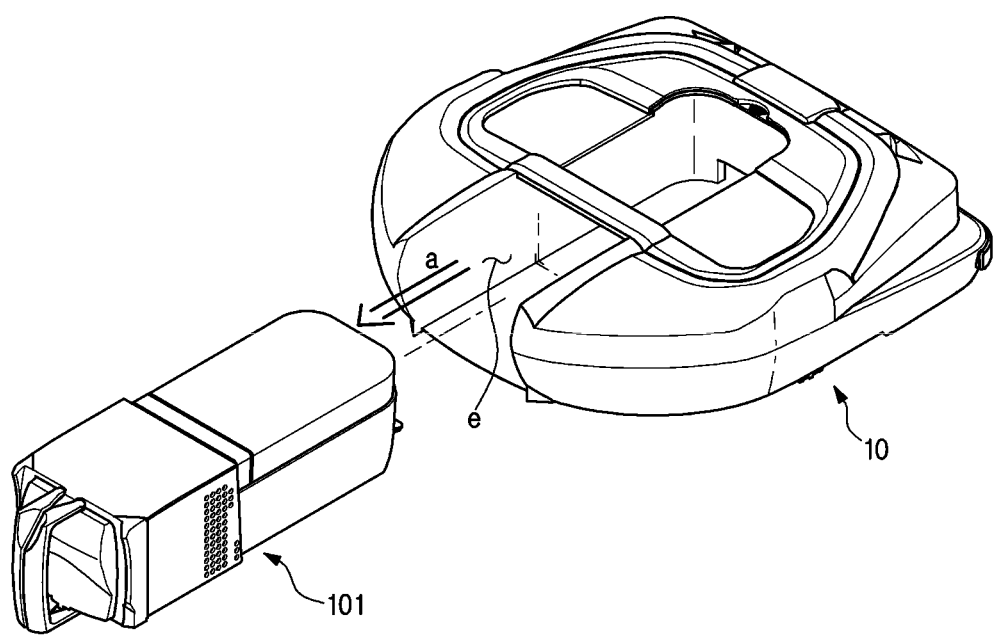

[Figure 3]
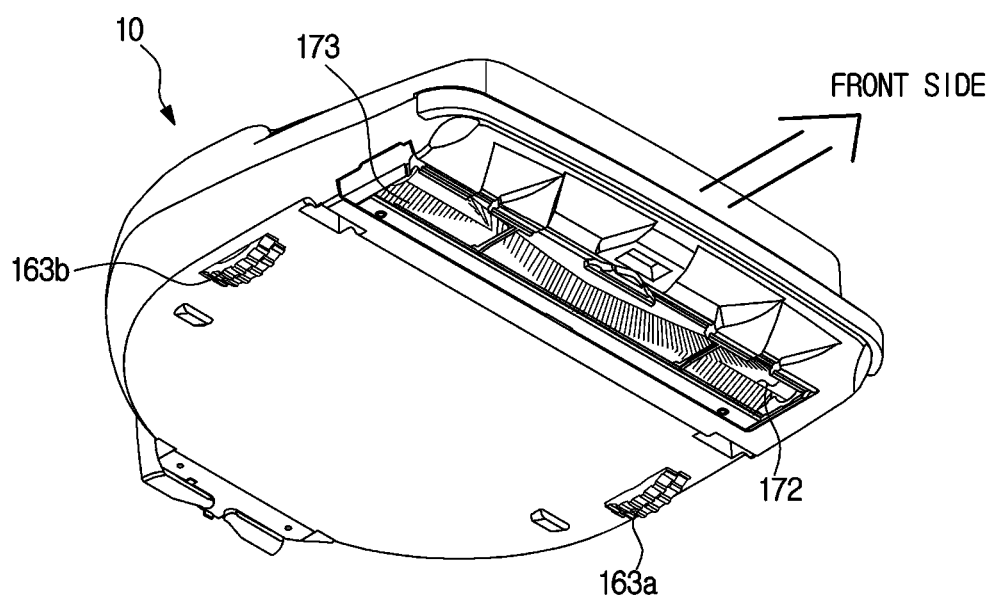

[Figure 4]
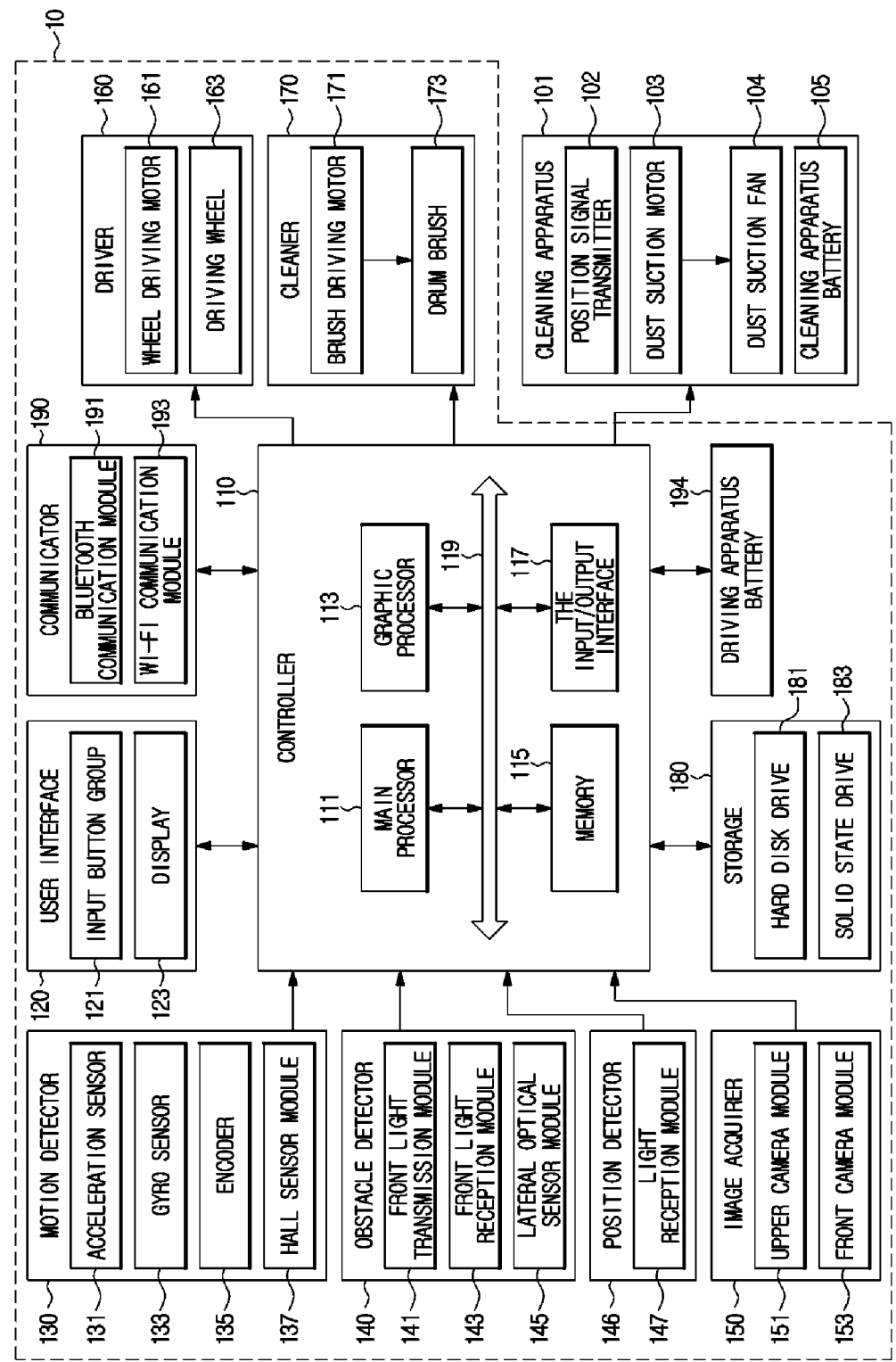

[Figure 5]
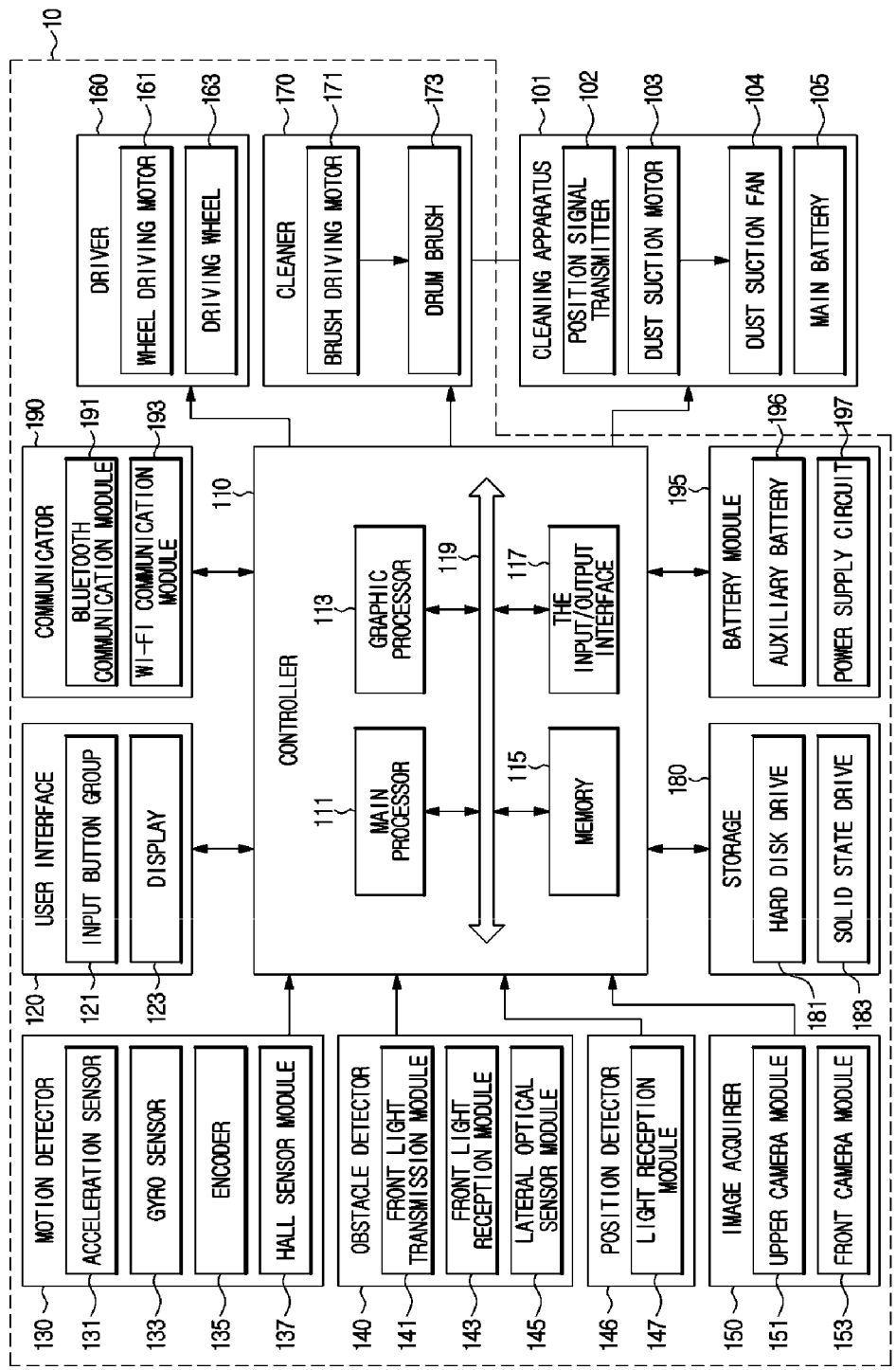

[Figure 6]
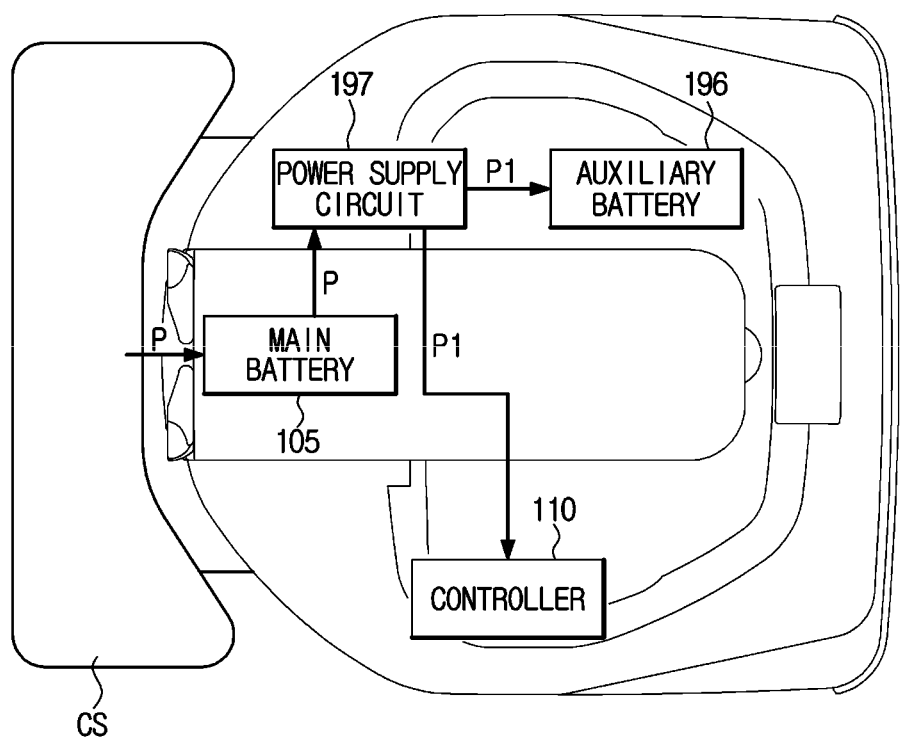

【Figure 7】
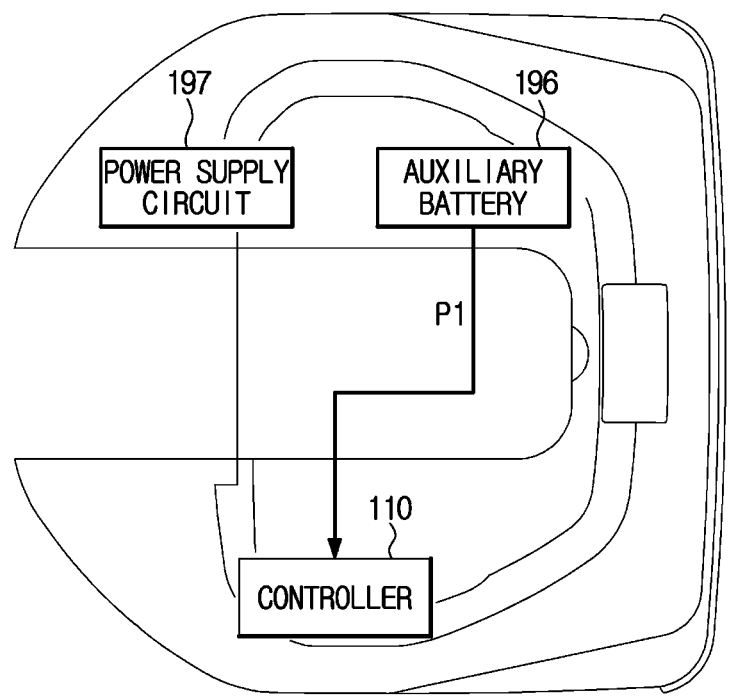

【Figure 8】
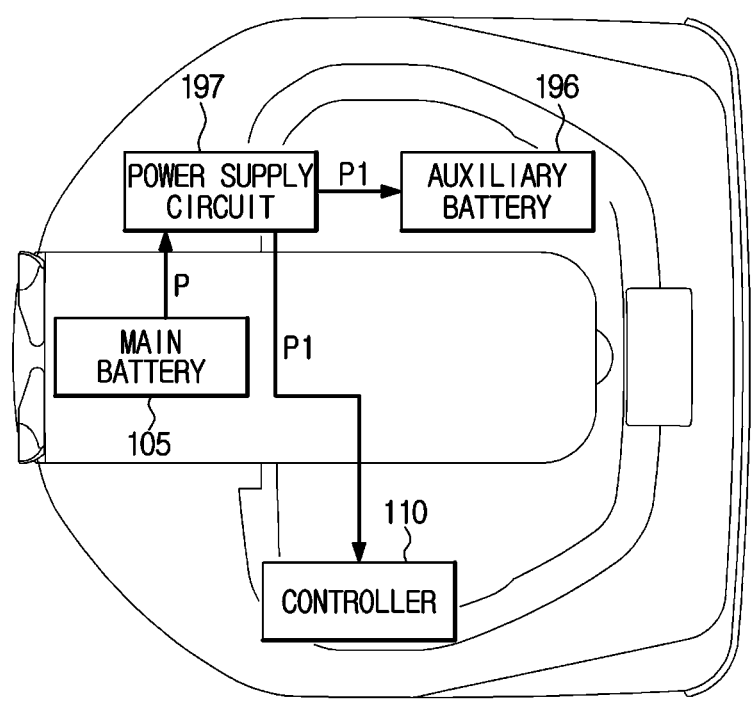

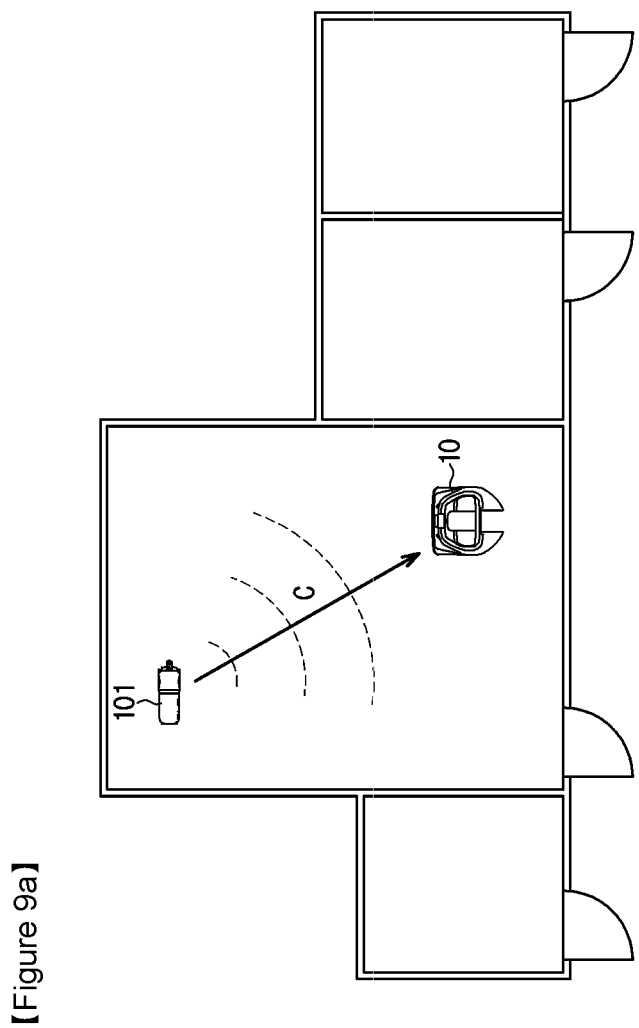
[Figure 9a]

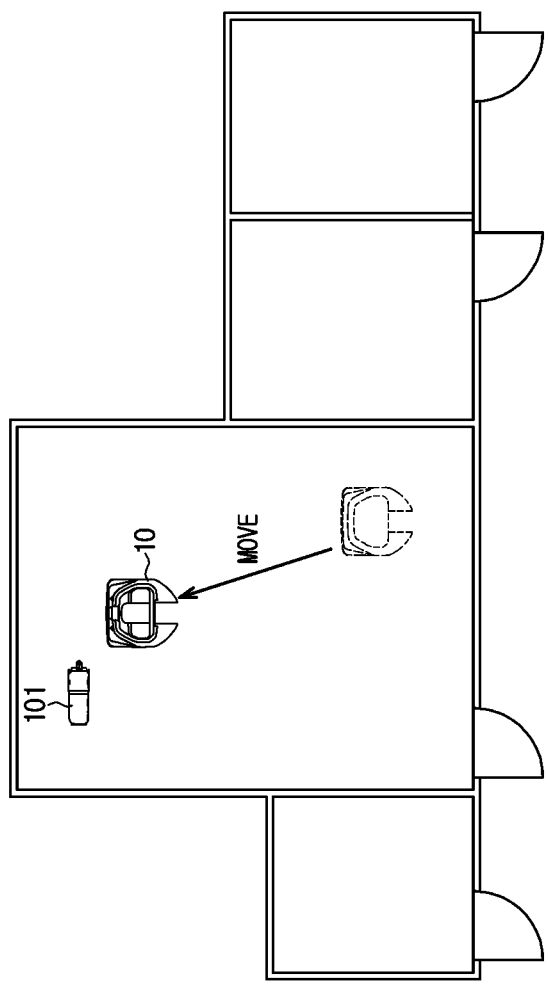
[Figure 9b]

【Figure 10a】
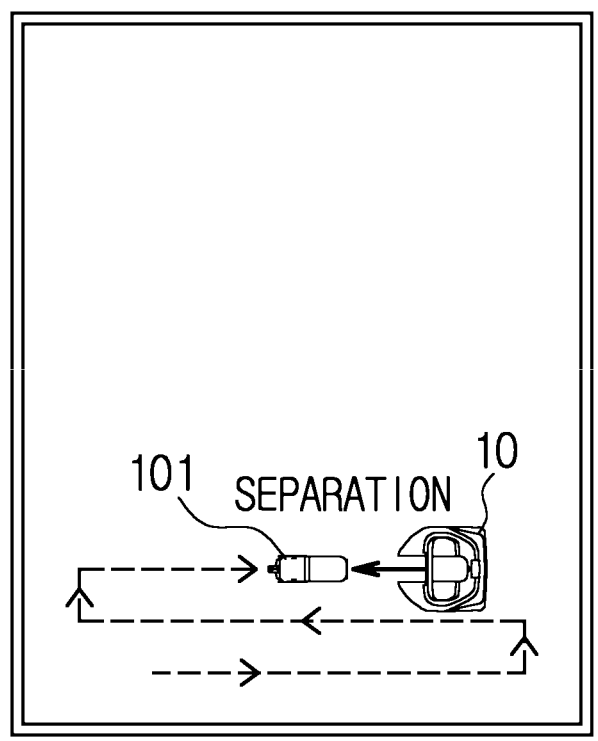

【Figure 10b】
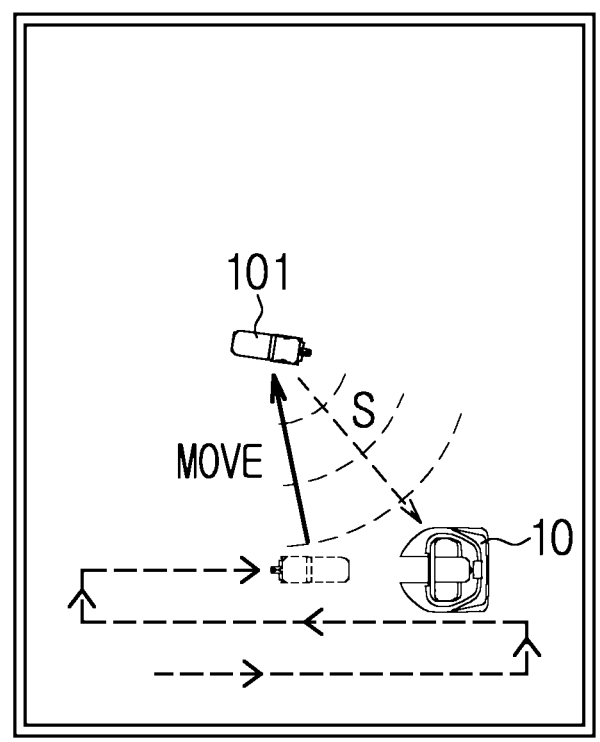

【Figure 10c】
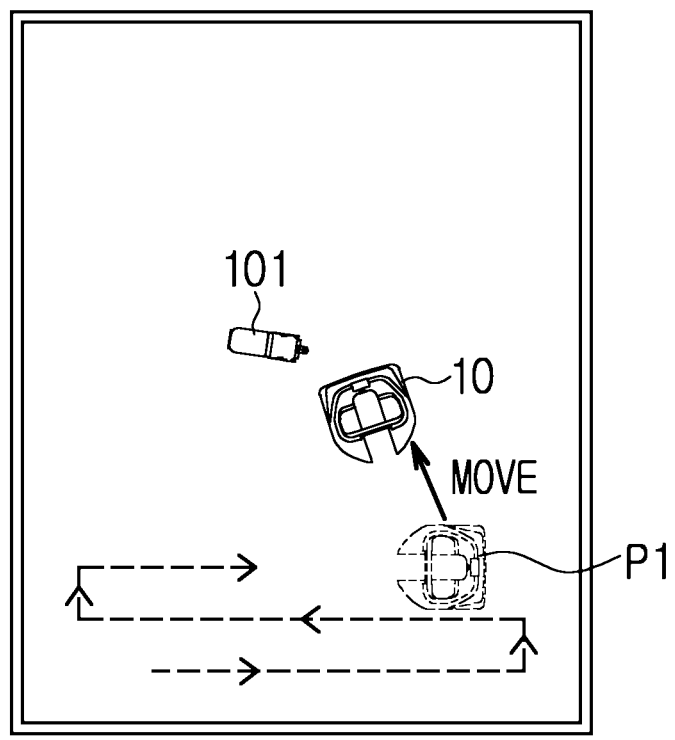

【Figure 10d】
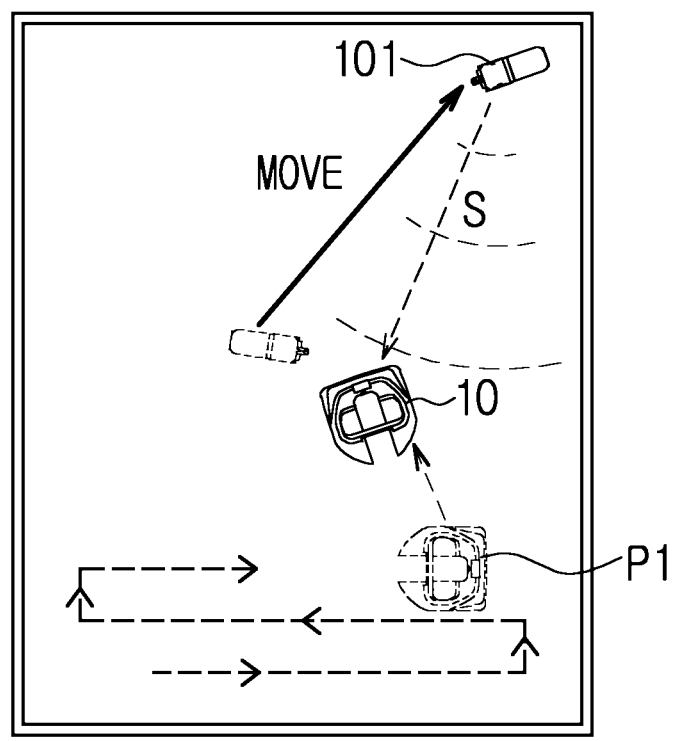

【Figure 10e】
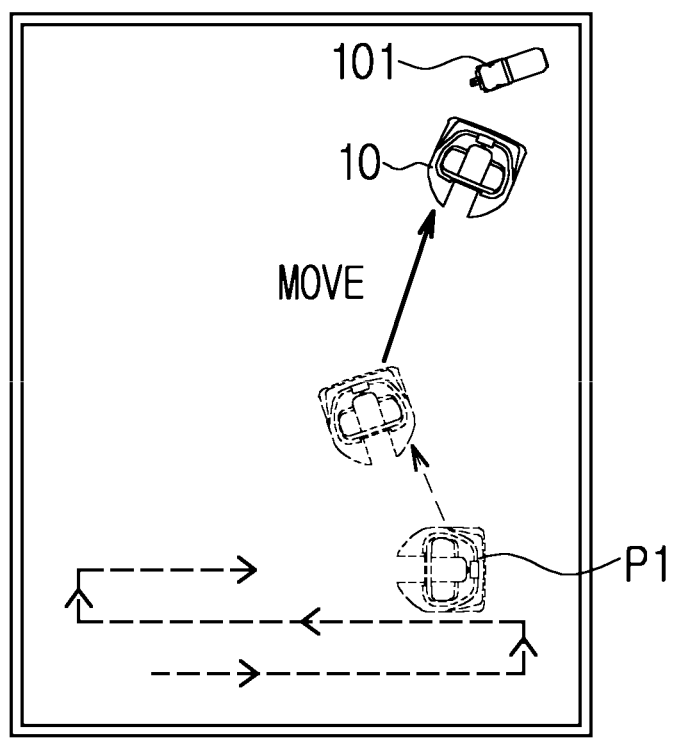

【Figure 11a】
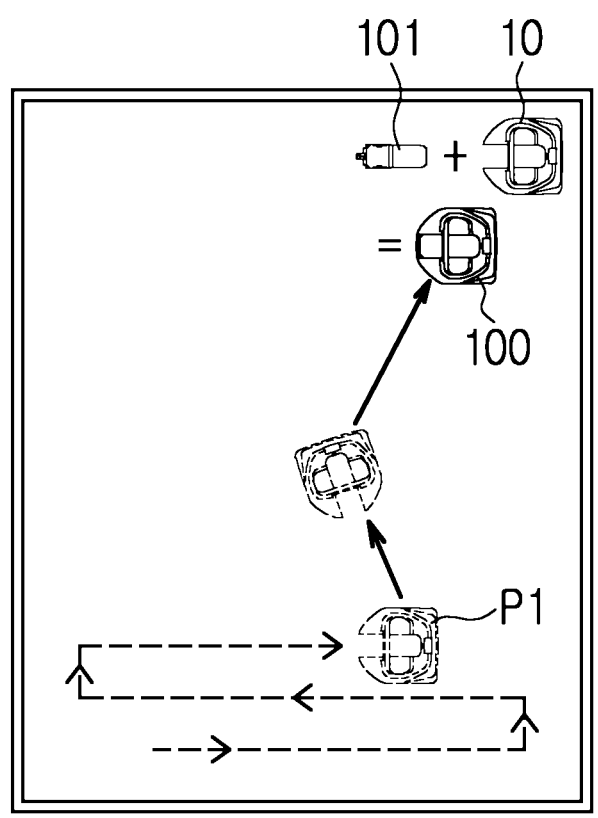

[Figure 11b]
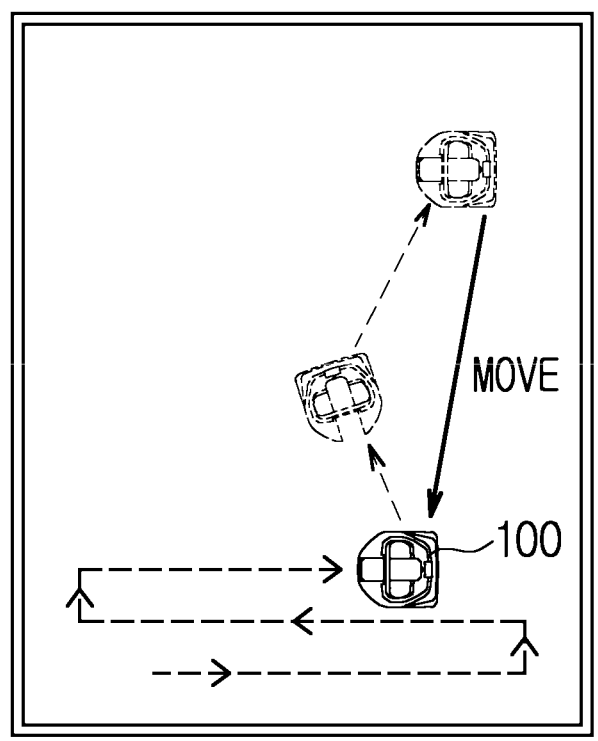

[Figure 11c]
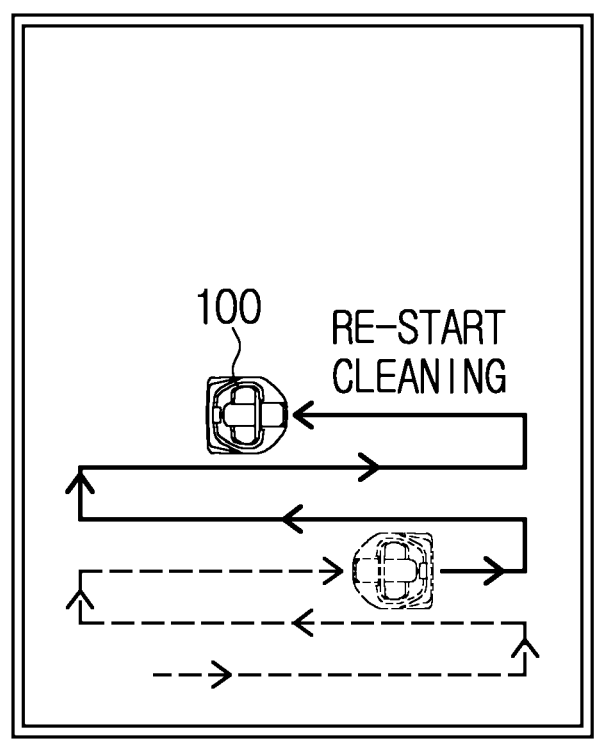

[Figure 12a]
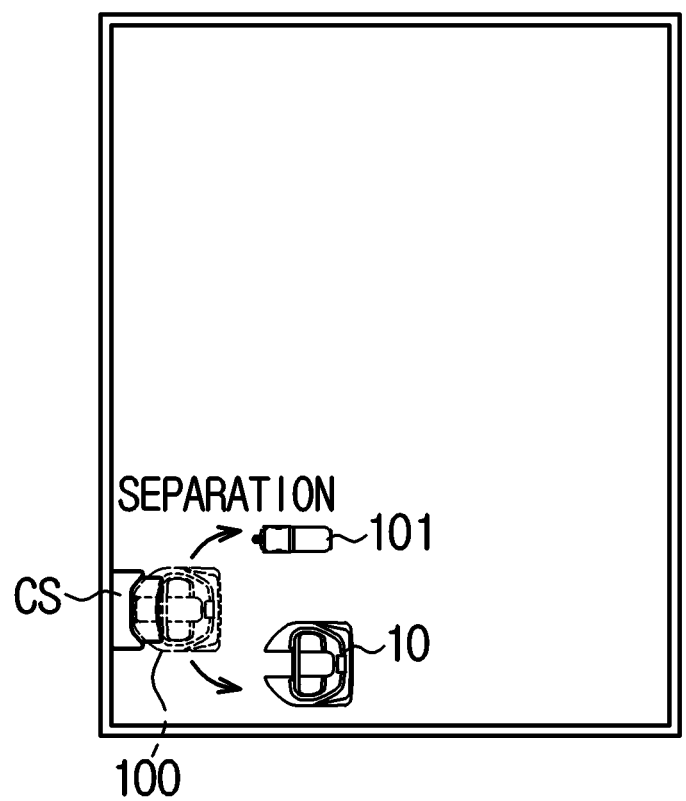

[Figure 12b]
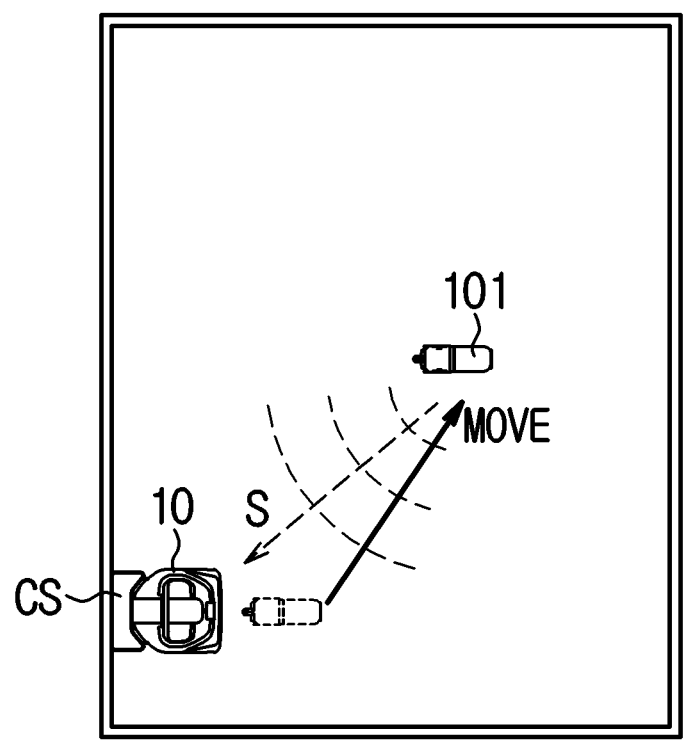

【Figure 12c】
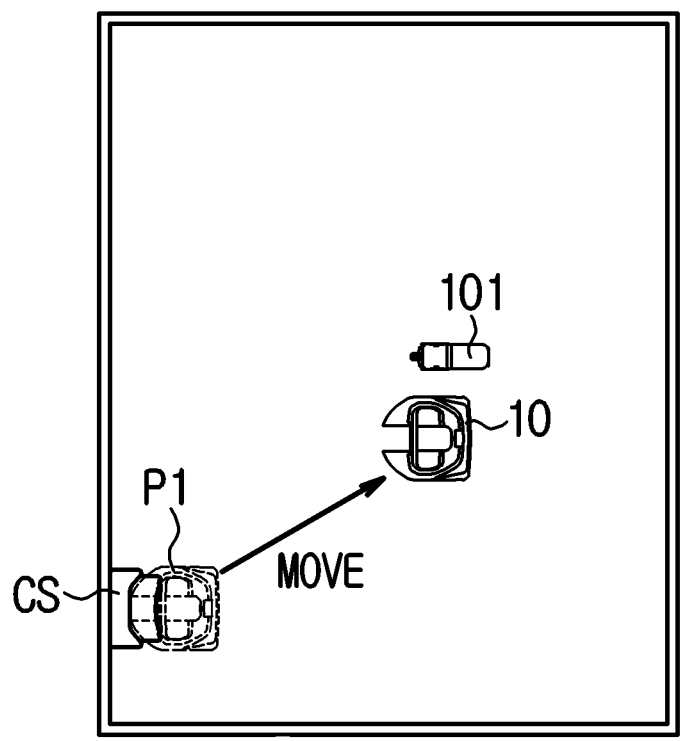

[Figure 12d]
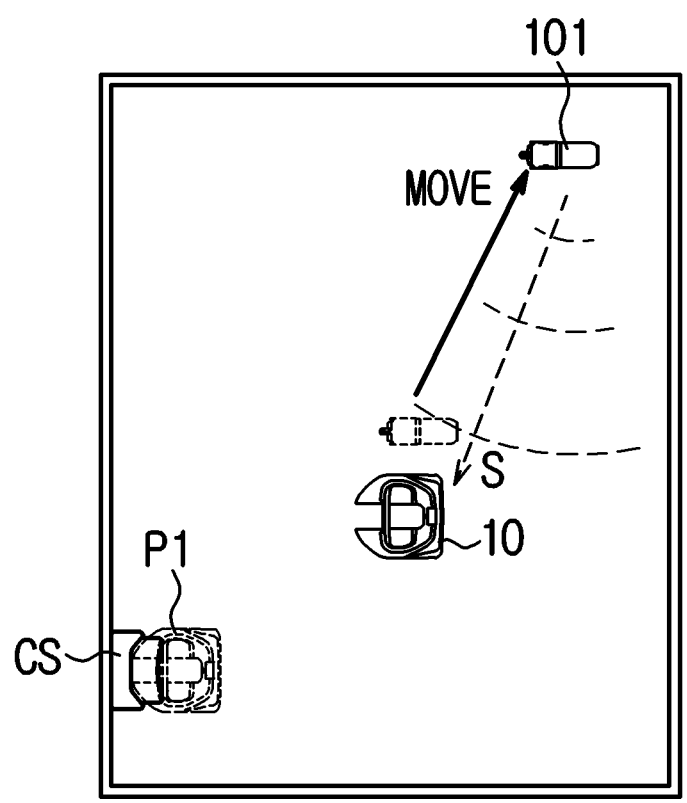

【Figure 12e】
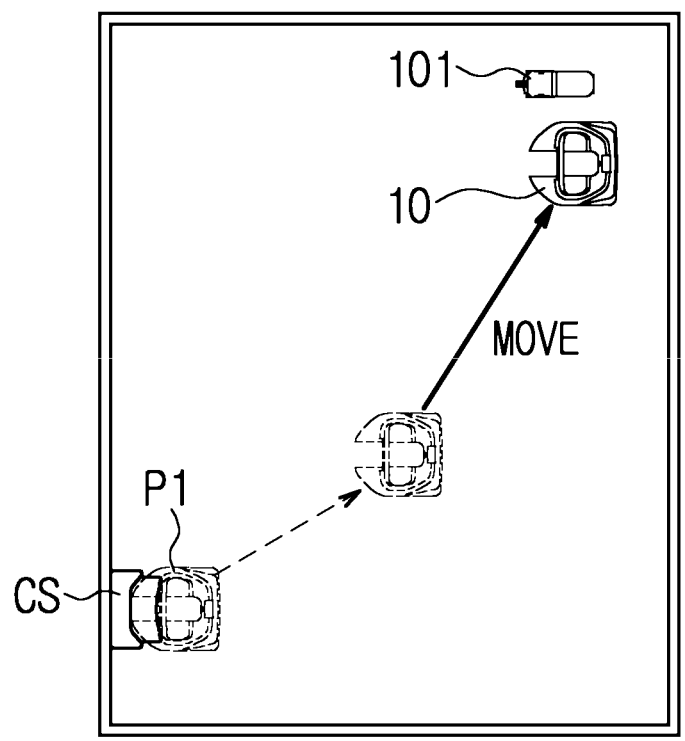

【Figure 13a】
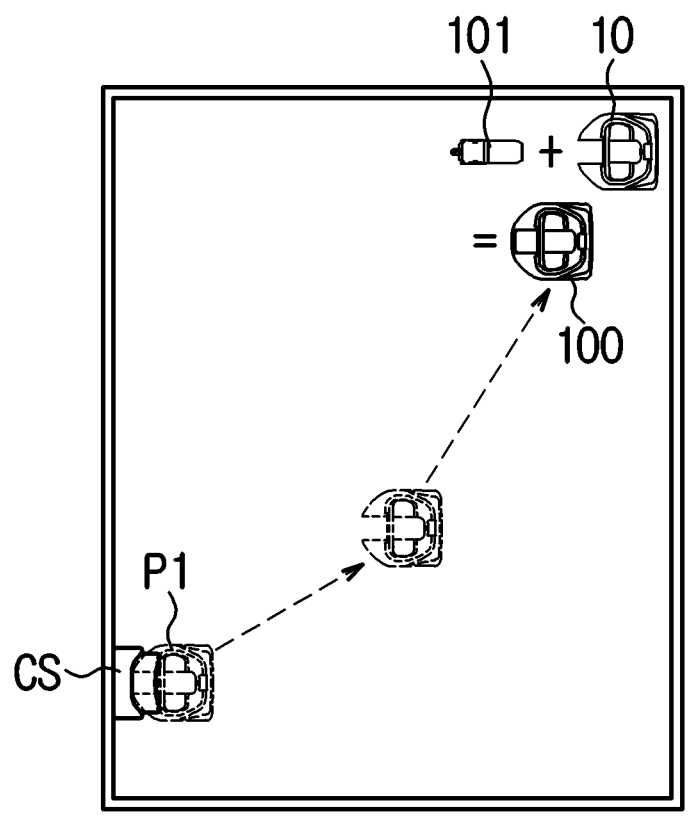

【Figure 13b】
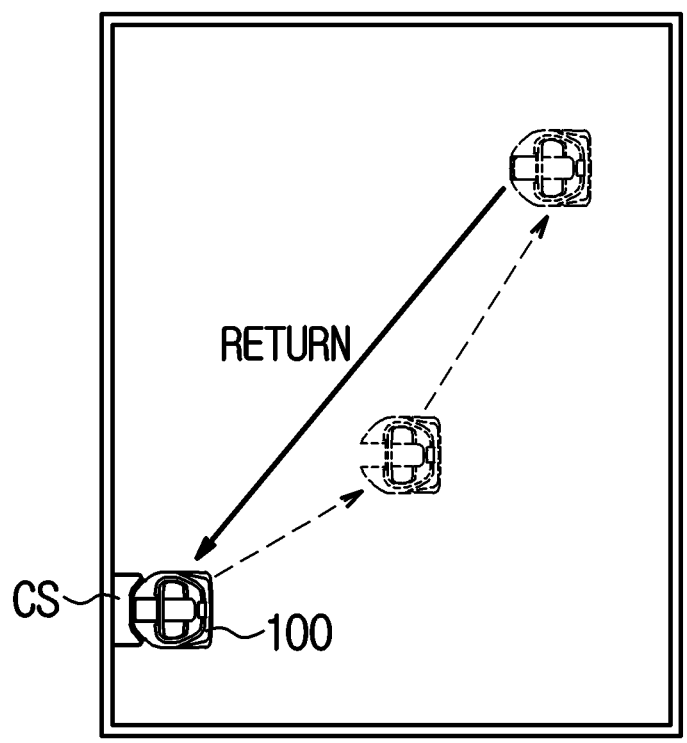

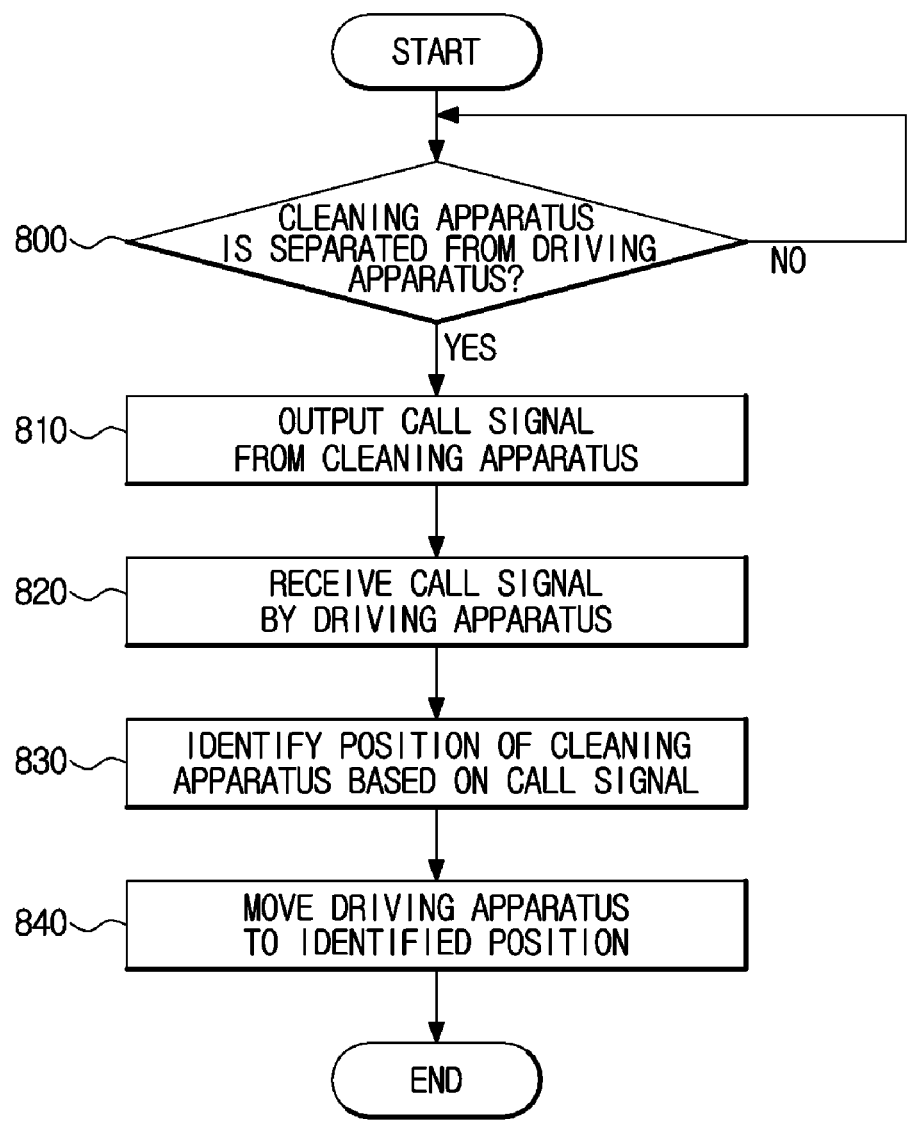
[Figure 14]

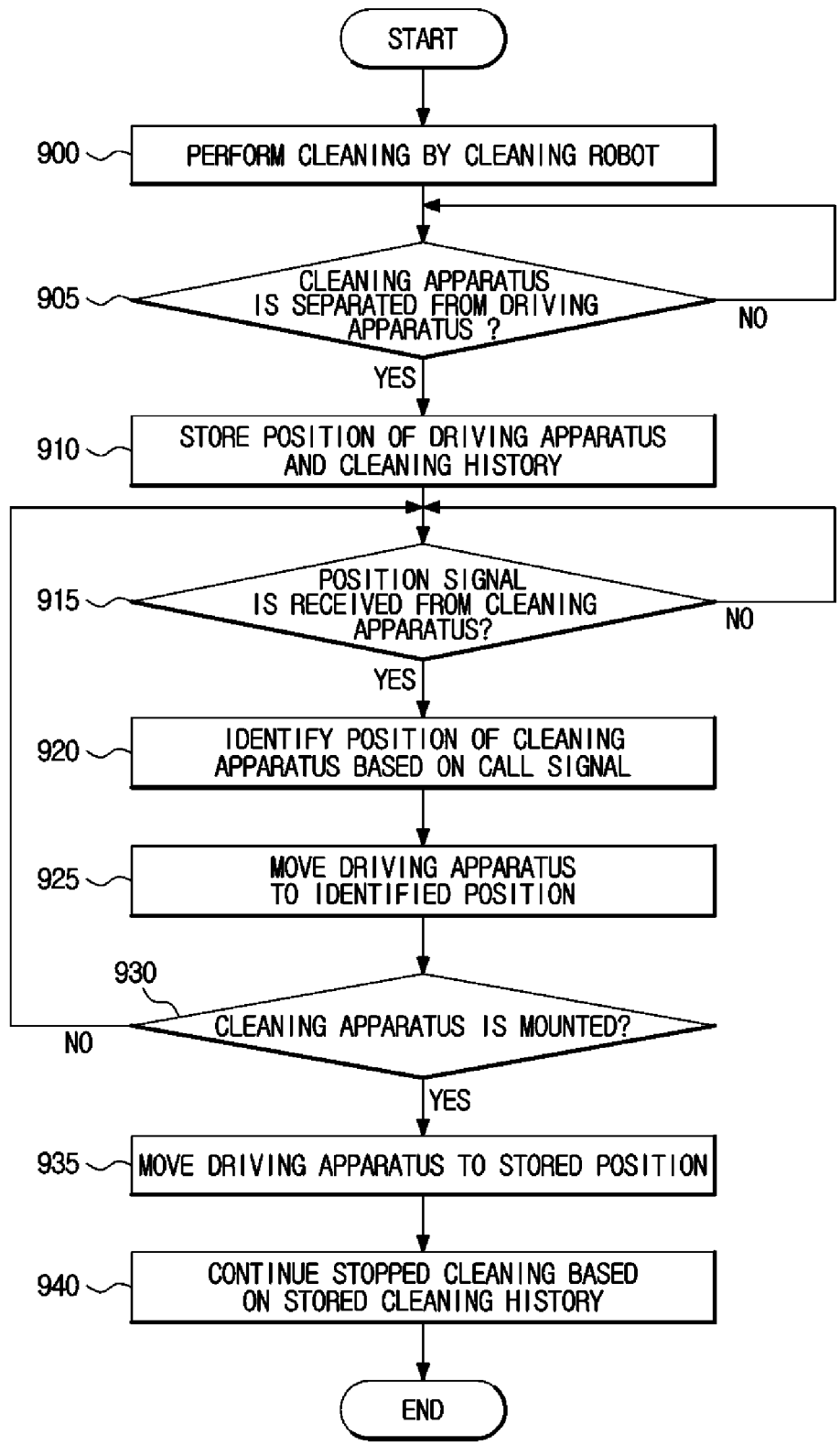
[Figure 15]

【Figure 16】
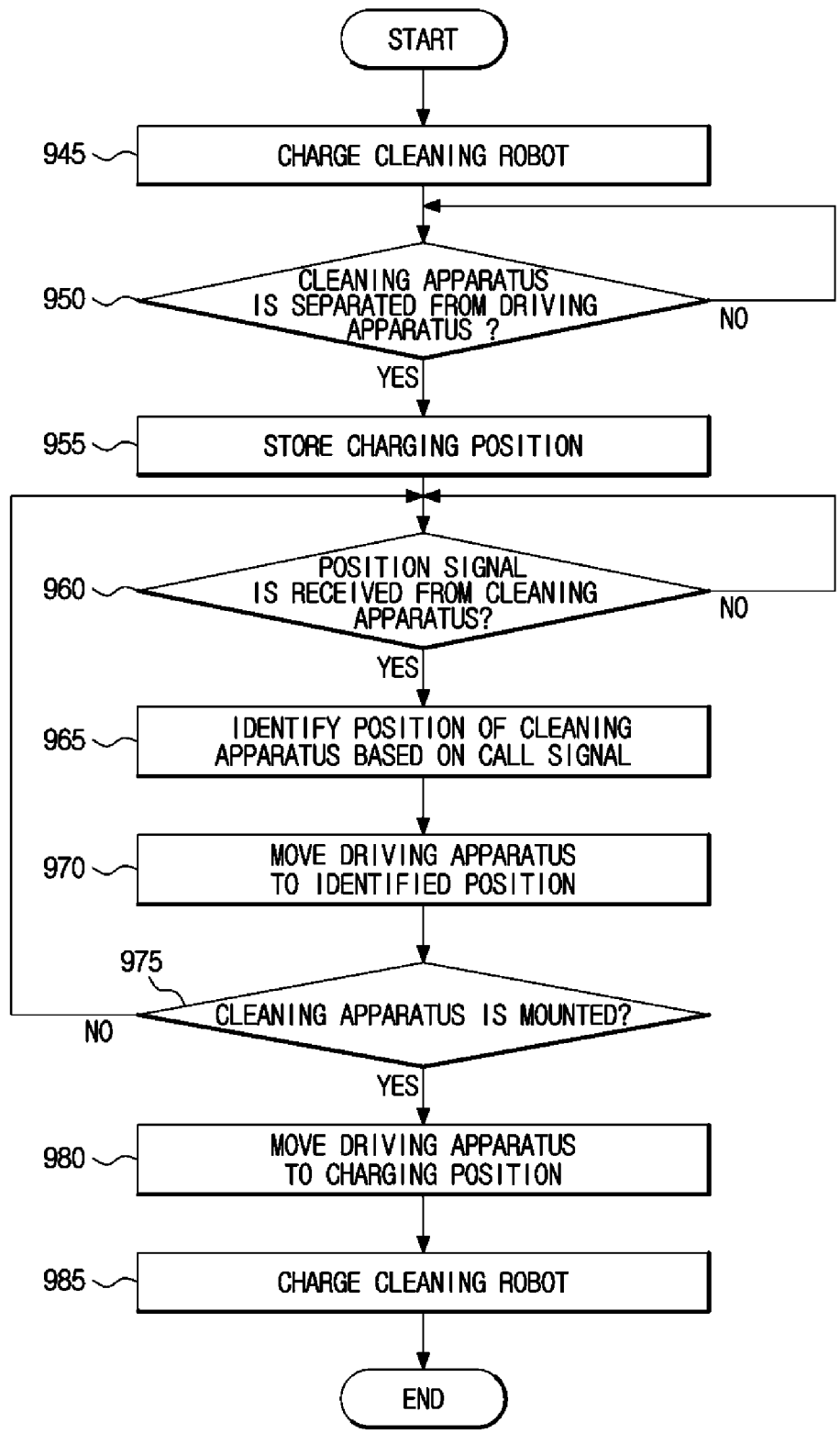

CLEANING ROBOT AND METHOD FOR CONTROLLING SAME

TECHNICAL FIELD

Embodiments of the present disclosure relate to a cleaning robot and a controlling method thereof.

BACKGROUND ART

A cleaning robot is a device for automatically cleaning a cleaning space by suctioning foreign matters such as dust accumulated on a floor while driving in the cleaning space. That is, the cleaning robot drives in the cleaning space and cleans the cleaning space.

There is an attempt to combine the advantages of a miniature wireless vacuum cleaner with the advantages of a cleaning robot that cleans the cleaning space while driving in the cleaning space.

DISCLOSURE

Technical Problem

Therefore, it is an aspect of the present disclosure to a cleaning robot capable of allowing a driving apparatus to move along a cleaning apparatus when the cleaning apparatus is separated from the driving apparatus, and a controlling method thereof.

The disclosed embodiment further provides a cleaning robot including a traveling device that stores a separated position of the cleaning device when the cleaning device is separated from the traveling device, and moves to a stored position when the cleaning device is mounted on the traveling device, and a control method thereof do.

Technical Solution

In accordance with an aspect of the disclosure, a cleaning robot includes a driving apparatus provided with a mounting groove configured to allow a cleaning apparatus to be removably mounted, and the cleaning apparatus removably mounted to the mounting groove. When the cleaning apparatus is separated from the mounting groove, the driving apparatus stores a position of the driving apparatus upon the separation of the cleaning apparatus and when the cleaning apparatus is mounted to the mounting groove, the driving apparatus moves to the stored position.

When the cleaning apparatus is separated from the mounting groove, the driving apparatus may identify a position of the cleaning apparatus, and when a distance between the cleaning apparatus and the driving apparatus is equal to or greater than a pre-selected distance, the driving apparatus may move along the cleaning apparatus.

When the cleaning apparatus is separated from the mounting groove during the cleaning robot performs cleaning, the driving apparatus may store cleaning data up to the time of the separation of the cleaning apparatus, and when the cleaning apparatus is mounted to the mounting groove, the driving apparatus may continue the cleaning that was being performed, based on the stored cleaning data.

When a call signal is transmitted from the cleaning apparatus separated from the mounting groove, the driving apparatus may move to a position of the cleaning apparatus by receiving the call signal.

The cleaning apparatus may include an inputter configured to receive a call command calling the driving apparatus to a position of the cleaning apparatus. The cleaning apparatus may transmit the call signal to the driving apparatus when the call command is received through the inputter.

When the cleaning apparatus is mounted to the mounting groove after the cleaning apparatus is separated from the mounting groove during the cleaning robot is charged, the driving apparatus may move to a position for charging and re-start the charging.

The driving apparatus may include a driving apparatus battery configured to supply power to allow the driving apparatus to move although the cleaning apparatus is separated from the driving apparatus, a position detector configured to identify a position of the cleaning apparatus by receiving a position signal that is output from the cleaning apparatus when the cleaning apparatus is separated, and a driving apparatus controller configured to control the movement of the driving apparatus based on the identification result of the position detector.

The controller may store a position of the driving apparatus upon the separation of the cleaning apparatus when the cleaning apparatus is separated from the mounting groove, and the controller may move the driving apparatus to the stored position when the cleaning apparatus is mounted to the mounting groove.

The controller may identify a position of the cleaning apparatus based on the identification result of the position detector when the cleaning apparatus is separated from the mounting groove, and when a distance between the cleaning apparatus and the driving apparatus is equal to or greater than a pre-selected distance, the controller may move the driving apparatus along the cleaning apparatus.

When the cleaning apparatus is separated from the mounting groove during the cleaning robot performs cleaning, the controller may store cleaning data up to the time of the separation of the cleaning apparatus, and when the cleaning apparatus is mounted to the mounting groove, the controller may control the cleaning robot to continue the cleaning that was being performed, based on the stored cleaning data.

When the position detector receives a call signal transmitted from the cleaning apparatus separated from the mounting groove, the controller may move the driving apparatus to a position of the cleaning apparatus based on the received call signal.

When the cleaning apparatus is mounted to the mounting groove after the cleaning apparatus is separated from the mounting groove during the cleaning robot is charged, the controller may move the driving apparatus to a position for charging the driving apparatus, to allow the charging to re-start.

The cleaning apparatus may include a position signal transmitter configured to transmit a position signal indicating a position of the cleaning apparatus when the cleaning apparatus is separated from the mounting groove, and a battery configured to supply power for performing a cleaning function of the cleaning apparatus.

The cleaning apparatus may include a main battery configured to supply power for driving and cleaning of the cleaning robot, and the driving apparatus may include an auxiliary battery configured to store a position of the driving apparatus although the cleaning apparatus is separated from the mounting groove and configured to supply power for storing cleaning data.

The driving apparatus may include a voltage regulator configured to convert a voltage, which is supplied from the main battery when cleaning apparatus is mounted to the mounting groove, into a voltage for charging the auxiliary battery.

When the cleaning robot is charged, the auxiliary battery may be charged by a voltage, which is supplied from a charging power supply and then regulated by passing through the main battery and the voltage regulator, and when the cleaning robot is not connected to the charging power supply, the auxiliary battery may be charged by a voltage, which is supplied from the main battery and then regulated by passing through the voltage regulator.

In accordance with another aspect of the disclosure, a controlling method of a cleaning robot including a driving apparatus and a cleaning apparatus removably mounted to a mounting groove of the driving apparatus, the controlling method includes storing a position of the driving apparatus upon the separation of the cleaning apparatus, when the cleaning apparatus is separated from the mounting groove, identifying a position of the driving apparatus when the cleaning apparatus is mounted to the mounting groove, and moving the driving apparatus to the stored position when the driving apparatus is not placed in the stored position.

The controlling method may further include identifying a position of the cleaning apparatus when the cleaning apparatus is separated from the mounting groove, and moving the driving apparatus along the cleaning apparatus when a distance between the cleaning apparatus and the driving apparatus is equal to or greater than a pre-selected distance.

The identification of the position of the cleaning apparatus may include transmitting a signal indicating a position of the cleaning apparatus, from a position signal transmitter of the cleaning apparatus; and identifying a position of the cleaning apparatus by receiving the position signal by a position detector of the driving apparatus.

The storage of the position of the driving apparatus upon the separation of the cleaning apparatus when the cleaning apparatus is separated from the mounting groove may include storing cleaning data up to the time of the separation of the cleaning apparatus, when the cleaning apparatus is separated from the mounting groove during the cleaning robot performs cleaning, and continuing the cleaning that was being performed, based on the stored cleaning data when the driving apparatus moves to the stored position.

The storage of the position of the driving apparatus upon the separation of the cleaning apparatus when the cleaning apparatus is separated from the mounting groove may include storing a charging position of the cleaning robot when the cleaning apparatus is separated from the mounting groove during the cleaning robot is charged, and charging of the cleaning robot when the driving apparatus moves to the charging position.

The controlling method may further include outputting a call signal to the driving apparatus from the cleaning apparatus is separated from the mounting groove, and moving the driving apparatus to the position of the cleaning apparatus when the driving apparatus receives the call signal.

Advantageous Effects

As is apparent from the above description, according to the cleaning robot and a controlling method thereof, since the driving apparatus moves along the cleaning apparatus after the cleaning apparatus is separated, it may be possible to reduce the inconvenience that a user should go to the driving apparatus to mount the cleaning apparatus to the driving apparatus.

In addition, since the operation, which is stopped upon the separation, continues when the cleaning apparatus is mounted, it may be possible to reduce the inconvenience that a user should memorize information related to the operation, for proceeding with the stopped operation.

DESCRIPTION OF DRAWINGS

FIG. 1 is a view illustrating an exterior of a cleaning robot in which a cleaning apparatus is mounted to a driving apparatus according to an embodiment;

FIG. 2 is a view illustrating a state in which the cleaning apparatus of the cleaning robot is separated from the driving apparatus according to an embodiment;

FIG. 3 is a bottom view of the cleaning robot according to an embodiment;

FIGS. 4 and 5 are control block diagrams of the cleaning robot according to an embodiment;

FIG. 6 is a view illustrating an example in which a battery of the cleaning apparatus and a battery of the driving apparatus are charged during the cleaning robot is charged according to an embodiment;

FIG. 7 is a view illustrating an example in which power is supplied from the battery of the driving apparatus when the cleaning apparatus of the cleaning robot is separated according to an embodiment;

FIG. 8 is a view illustrating an example in which the battery of the driving apparatus is charged when the cleaning apparatus is mounted to the driving apparatus of the cleaning robot according to an embodiment;

FIG. 9 is a view illustrating an example in which the cleaning apparatus of the cleaning robot calls the driving apparatus according to an embodiment;

FIG. 10 is a view illustrating an example in which the driving apparatus of the cleaning robot moves along the cleaning apparatus according to an embodiment;

FIG. 11 is a view illustrating an example in which the driving apparatus moves when the cleaning apparatus of the cleaning robot is mounted to the driving apparatus according to an embodiment;

FIG. 12 is a view illustrating an example in which the driving apparatus moves when the cleaning apparatus is separated during the cleaning robot is charged according to an embodiment;

FIG. 13 is a view illustrating an example in which the driving apparatus moves when the cleaning apparatus of the cleaning robot is mounted to the driving apparatus according to an embodiment; and FIGS. 14 to 16 are a flowchart illustrating a controlling method of cleaning robot according to an embodiment.

MODE FOR INVENTION

Reference will now be made in detail to embodiments of the present disclosure, examples of which are illustrated in the accompanying drawings. FIG. 1 is a view illustrating an exterior of a cleaning robot in which a cleaning apparatus 101 is mounted to a driving apparatus 10 according to an embodiment, and FIG. 2 is a view illustrating a state in which the cleaning apparatus 101 of the cleaning robot is separated from the driving apparatus 10 according to an embodiment. FIG. 3 is a bottom view of the cleaning robot according to an embodiment, and FIGS. 4 and 5 are control block diagrams of the cleaning robot according to an embodiment.

Referring to FIGS. 1 to 5, the cleaning robot 100 may include a driving apparatus 10 and a cleaning apparatus 101 removably mounted to the driving apparatus 10. As illustrated in FIGS. 1 and 2, the driving apparatus 10 includes a mounting groove (e) provided in the form corresponding to the size and shape of the cleaning apparatus 101 to allow the cleaning apparatus 101 to be mounted. FIG. 1 illustrates a state in which the cleaning apparatus 101 is mounted to the driving apparatus 10. In the state in which the cleaning apparatus 101 is mounted to the driving apparatus 10, as illustrated in FIG. 1, a user may grip a handle of the cleaning apparatus 101 and apply a force to a direction (a) for pulling out the cleaning apparatus 101 from the mounting groove (e), as illustrated in FIG. 2, thereby separating the cleaning apparatus 101 from the driving apparatus 10. A fixing member may be provided in the mounting groove (e) to prevent the cleaning apparatus 101 from being separated from the mounting groove (e) unless a pre-selected magnitude or more force is applied to a pre-selected direction. In addition, in the mounting groove (e) and the cleaning apparatus 101, a connection terminal may be provided to electrically connect the driving apparatus to the cleaning apparatus. The connection terminal may be provided on at least one surface of the cleaning apparatus in contact with the mounting groove. The connection terminal may be provided on at least one surface of the mounting groove in contact with the cleaning apparatus. When the cleaning apparatus is mounted to the mounting groove, the connection terminal of the mounting groove of the cleaning apparatus is brought into contact. The connection terminal may be formed of a conductive material.

In addition, the cleaning apparatus 101 includes a structure generating a suction force for sucking dust. When the cleaning apparatus 101 is mounted to the driving apparatus 10, the cleaning apparatus 101 may provide the suction force for cleaning to allow the cleaning robot 100 to clean a cleaning region while the cleaning robot 100 drives on the cleaning region. When the cleaning apparatus 101 is separated from the driving apparatus 10, the cleaning apparatus 101 may perform the function of a wireless cleaner by itself. That is, the user can separate the cleaning apparatus 101 from the driving apparatus 10 and operate the cleaning apparatus 101 to clean the desired area.

The driving apparatus 10 includes a configuration for driving the cleaning robot 100. That is, in a state in which the cleaning apparatus 101 is mounted to the mounted to the driving apparatus 10, the driving apparatus 10 may move the cleaning robot 100 to allow the cleaning robot 100 to clean the cleaning region while the cleaning robot 100 drives on the cleaning region. In addition, when the cleaning apparatus 101 is separated from the driving apparatus 10, the driving apparatus 10 may identify a position of the cleaning apparatus 101 and then move along the cleaning apparatus 101. When the cleaning apparatus 101 is re-mounted to the driving apparatus 10, the driving apparatus 10 may move to the position upon the separation of the cleaning apparatus 101 and then continue an operation previously performed. A description thereof will be described later in detail.

Hereinafter the cleaning apparatus 101 and the driving apparatus 10 of the cleaning robot 100 will be described in detail with reference to FIGS. 4 and 5. Referring to FIG. 4, the driving apparatus 10 may include an user interface 120 interacting with a user, a motion detector 130 acquiring information on the movement of the cleaning robot 100, an obstacle detector 140 identifying an obstacle in a cleaning space, an image acquirer 150 acquiring an image of vicinity of the cleaning robot 100, a position detector 146 identifying a position of the cleaning apparatus 101 when the cleaning apparatus 101 is separated, a driver 160 moving the cleaning robot 100, a cleaner 170 supporting cleaning of the cleaning apparatus 101, a storage 180 storing program and data related to an operation of the cleaning robot 100, a driving apparatus battery 194 providing power for driving of the cleaning robot 100, a communicator 190 communicating with an external device, and a controller 110 controlling an operation of the cleaning robot 100. In addition, referring to FIG. 4, the cleaning apparatus 101 may include a position signal transmitter 102 transmitting a position signal (s) indicating a position of the cleaning apparatus 101 when the cleaning apparatus 101 is separated, a dust suction fan 104 suctioning dust scattered by the cleaner 170, a dust suction motor 103 rotating the dust suction fan, and a cleaning apparatus battery 105 supplying power for operating of the dust suction motor.

The user interface 120 may be provided on one side of the driving apparatus 10 of the cleaning robot 100, particularly on an upper side thereof. The user interface 120 may include a plurality of input buttons receiving control commands from the user, and a display displaying information on an operation of the cleaning robot 100. The user interface may be provided not only in the driving apparatus 10 but also in the cleaning apparatus 101. When the user interface is provided in the cleaning apparatus 101, the user interface may be provided on the upper surface of the cleaning apparatus 101. The user interface may include a plurality of input buttons receiving control commands for performing cleaning, and a display displaying information on an operation of the cleaning apparatus 101 in the same manner as the driving apparatus 10. When the user interface is provided both of the driving apparatus 10 and the cleaning apparatus 101, the user interface of the cleaning apparatus 101 may be configured to be operated upon being separated from the driving apparatus 10. That is, when the cleaning apparatus 101 is mounted to the driving apparatus 10, the user interface of the driving apparatus 10 may be operated and when the cleaning apparatus 101 is separated from the driving apparatus 10, the user interface of the cleaning apparatus 101 may be operated. However, the operation of the user interface is not limited thereto. The cleaning apparatus 101 may be configured to be operated even when the cleaning apparatus 101 is mounted to the driving apparatus 10. Hereinafter a description thereof will be described with the user interface of the driving apparatus 10.

The plurality of input buttons 121 may include a power button turning on or off the cleaning robot 100, an operation button operating or stopping the cleaning robot 100, and a return button returning the cleaning robot 100 to a charging station (CS).

Each button contained in the plurality of input buttons may employ a push switch and a membrane switch detecting a user pressure, or a touch switch detecting a touch of a user's body part.

The display 123 displays the information of the cleaning robot 100 in response to a control command inputted by the user. For example, the display 123 may display an operation state of the cleaning robot 100, a power state of the cleaning robot 100, a cleaning mode selected by a user, and information on whether to return to the charging station (CS).

The display 123 may employ Light Emitting Diode (LED), Organic Light Emitting Diode (OLED) or liquid crystal display (LCD).

In addition, the display 123 may employ a touch screen panel (TSP) receiving a control command from a user, and displaying operation information corresponding to the received control command.

The touch screen panel may include a display displaying operation information and a control command that can be input by a user, a touch panel acquiring a coordinate in which a part of the user's body is contacted, and a touch screen controller identifying a control command input by a user, based on the contact coordinates identified by the touch panel.

The touch screen controller may recognize the control command input by the user by comparing the touch coordinates of the user acquired by the touch panel with the coordinates of the control command displayed through the display.

The user interface of the cleaning apparatus 101 may include a call button configured to receive a call command for calling the driving apparatus 10 to a position in which the cleaning apparatus 101 is placed, in a state in which the cleaning apparatus 101 is separated. When the call button is operated in response to a pre-selected call command, such as pressing the call button by the user, the cleaning apparatus 101 may output the call signal (c) to the driving apparatus 10. The call signal (c) may be output from the position signal transmitter 102 of the cleaning apparatus 101 and received by the position detector 146 of the driving apparatus 10. An example in which the cleaning apparatus 101 calls the driving apparatus 10 will be described later.

The motion detector 130 may acquire the movement of the cleaning robot 100 during the cleaning robot 100 moves on the cleaning space.

Particularly, the motion detector 130 may measure acceleration, a moving speed, moving displacement and a moving direction of the cleaning robot 100 during the cleaning robot 100 linearly moves. Further, the motion detector 130 may measure a rotational speed, rotational displacement, and a turning radius of the cleaning robot 100 during the cleaning robot 100 rotates.

The motion detector 130 may include an acceleration sensor 131, and a gyro sensor 133 detecting a motion of the cleaning robot 100 by itself, and an encoder 135 and a hall sensor module 137 detecting a rotation of a driving wheel 163 described later.

The acceleration sensor 131 may detect a linear movement. For example, the acceleration sensor 131 may measure linear acceleration, linear velocity, and linear displacement of the cleaning robot 100 using Newton's second law of motion (the law of acceleration).

The acceleration sensor 131 may employ MiCo Electro Mechanical System (MEMS) sensor that is miniaturized by fusing a micro-mechanical, micro-electronics and semiconductor process technology.

The gyro sensor 133 refers as a gyroscope or an angular velocity sensor and detects the rotational movement of the cleaning robot 100. Particularly, the gyro sensor 133 may measure the rotational angular velocity and the rotational displacement of the detection target using angular momentum conservation law, Sagnac effect, and Coriolis force.

The gyro sensor 133 also may employ a Micro Electro Mechanical System (MEMS) sensor. For example, a capacitance-type gyro sensor among MEMS-type gyro sensors may detect the variation of the capacitance according to a deformation of micro-mechanical structure due to the Coriolis force that is proportional to the rotational speed, and may estimate the rotational speed based on the variation of the capacitance.

The encoder 135 may include a light emitting element (not shown) emitting light, a light receiving element (not shown) receiving light, and a rotation slit (not shown) and a fixation slit (not shown) provided between the light emitting element and the light receiving element. The rotation slit may be provided to be rotated with the driving wheel 163, and the fixation slit may be provided to be fixed to the main body 101.

Due to a rotation of the rotation slit, light emitted from the light emitting element may be passed through the rotation slit and reached to the light receiving element, or blocked by the rotation slit. The light receiving element may output an electrical signal based on the light that is received according to the rotation of the rotation slit.

The controller 110 described later may estimate a rotational speed and a rotational displacement of the driving wheel 163 based on the electrical signal output by the light receiving element, and may estimate a linear motion speed, a linear displacement, a rotational movement speed, a rotational displacement of the cleaning robot 100 based on the rotational speed and the rotational displacement of the driving wheel 163.

The hall sensor module 137 may include a permanent magnet (not shown) generating a magnetic field and a hall sensor (not shown) detecting a magnetic field. The permanent magnet may be provided to rotate together with the driving wheel 163, and the hall sensors may be provided to be fixed to the driving apparatus 10.

Depending on the rotation of the permanent magnet, the hall sensor may detect or may not detect the magnetic field generated by the permanent magnet. As a result, the hall sensor may output an electric signal corresponding to the detected magnetic field in accordance with the rotation of the permanent magnet.

Further, the controller 110 described later may estimate a rotational speed and a rotational displacement of the driving wheel 163 based on the electrical signal output by the hall sensor, and may estimate a linear motion speed, a linear displacement, a rotational movement speed, a rotational displacement of the cleaning robot 100 based on the rotational speed and the rotational displacement of the driving wheel 163.

The obstacle detector 140 may detect an obstacle interrupting a movement of the cleaning robot 100.

"Obstacle" may represent all kind of things that protrude or dent from a floor of the cleaning space to interrupt a movement of the cleaning robot 100. The obstacle may include furniture, e.g. a table and a couch, a wall dividing the cleaning space or a porch lower than the floor of the cleaning space.

The obstacle detector 140 may include a front light transmission module 141 emitting light to a front side of the cleaning robot 100, a front light reception module 143 receiving light reflected by a front obstacle, and a lateral optical sensor module 145 transmitting light to a lateral side of the cleaning robot 100 and receiving light reflected by an obstacle.

According to an embodiment, the cleaning robot 100 may use light e.g. infrared light to detect an obstacle, but is not limited thereto. The cleaning robot 100 may use an ultrasonic wave and a radio wave.

The front light transmission module 141 may include a light source emitting light and a wide-angle lens diffusing the emitted light in a direction parallel to a cleaning floor.

The light source may employ Light Emitting Diode (LED) or Light Amplification by Simulated Emission of Radiation (LASER) diode, both of which emit light in the moving direction of the cleaning robot 100.

The wide-angle lens may be formed of material transmitting light, and configured to diffuse the emitted light in a direction parallel to the cleaning floor by using the refraction or the total reflection. Due to the wide-angle lens, light emitted from the front light transmission module 141 may be diffused in a fan shape toward a front side of the cleaning robot 100. Hereinafter light diffused in a direction parallel to the cleaning floor to have a fan shape will be referred to as "flat light".

As mentioned above, the front light transmission module 141 may emit the flat light to the moving direction of the cleaning robot 100.

The obstacle detector 140 may include a plurality of the front light transmission modules 141 to minimize a region to which flat light emitted from the front light transmission module 141 is not reached.

The front light reception module 143 may include a reflection mirror (not shown) focusing light reflected by an obstacle and an image sensor (not shown) receiving light reflected by the reflection mirror.

The image sensor may be provided under the reflection mirror and may receive light its moving direction changed by being reflected by the reflection mirror. In other words, the image sensor may acquire a two dimensional image formed on the reflection mirror by the reflection light reflected by an obstacle.

The image sensor may be configured with a two dimensional image sensor in which an optical sensor is arranged in two dimensions. Particularly, the image sensor may employ Complementary Metal Oxide Semiconductor (CMOS) sensor or Charge coupled device (CCD) sensor.

It may be appropriate that the image sensor employs the image sensor receiving light having the same wave length as that of light emitted from the light source of the front light transmission module 141. For example, when the light source emits light in an infrared range, the image sensor may employ an image sensor configured to acquire an image in an infrared range.

As mentioned above, the front light reception module 143 may acquire an image of obstacle that is generated by light reflected by an obstacle placed in the moving direction of the cleaning robot 100.

In addition, the front light reception module 143 may be provided in the number that is different from the number of the front light transmission module 141. As mentioned above, the front light transmission module 141 may diffuse light emitted from the light source in various directions by using the wide-angle lens, and the front light reception module 143 may focus light in various directions to the image sensor by using the reflection mirror. Therefore, the obstacle detector 140 may include different number of the front light transmission module 141 and the front light reception module 143.

The obstacle detector 140 detecting an obstacle placed in the moving direction of the cleaning robot 100 may be not limited to a configuration including the front light transmission module 141 generating the flat light in the moving direction of the cleaning robot 100 and the front light reception module 143 acquiring an image generated by light reflected by an obstacle. Therefore, the obstacle detector 140 may include an optical sensor module emitting light in a straight line toward a specific direction in front of the cleaning robot 100 and identifying the position of the obstacle by using light reflected from the obstacle.

The lateral optical sensor module 145 may include a left lateral optical sensor module emitting light to the left side of the cleaning robot 100 and receiving a light reflected by a left side obstacle; and a right lateral optical sensor module emitting light to the right side of the cleaning robot 100 and receiving a light reflected by a right side obstacle.

The lateral optical sensor module 145 may be used for a drive of the cleaning robot 100 as well as detecting an obstacle.

For example, when the cleaning robot 100 performs a border following travel that is driving while having a certain distance from an obstacle, the lateral optical sensor module 145 may measure a distance between a lateral side of the cleaning robot 100 and an obstacle, and the controller 110 may control the driver 160 so that the cleaning robot 100 maintains a certain distance from an obstacle based on a result of a detection of the lateral optical sensor module 145.

The lateral optical sensor module 145 may be configured to assistant the front light transmission module 141 and the front light reception module 143 to detect an obstacle placed in a front side of the cleaning robot 100, and the obstacle detector 140 may not include the lateral optical sensor module 145 as needed.

The position detector 146 acquires a position signal (s) transmitted from the cleaning apparatus 101 upon being separated from the driving apparatus 10. According to an embodiment, the position detector 146 may be implemented by a light reception module 147 receiving light such as an infrared light, but is not limited thereto. Therefore, the position detector 146 may be implemented by a device configured to receive laser, ultrasound or radio waves. The position signal transmitter 102 of the cleaning apparatus 101 may be implemented by a light transmitter transmitting light such as an infrared light or a device configured to transmit laser, ultrasound or radio waves. The position detector 146 of the driving apparatus 10 may be selected based on the type of signal transmitted from the position signal transmitter 102 of the cleaning apparatus 101.

A plurality of position detectors 146 may be provided on front, left and right, and rear side of the driving apparatus 10 at preselected intervals. According to an example, both of the obstacle detector and the position detector 146 may be installed. Alternatively, the position detector 146 may be not installed and the obstacle detector may be configured to acquire the position signal (s) transmitted from the cleaning apparatus 101.

When the position detector 146 receives the position signal (s) from the cleaning apparatus 101, the controller 110 may calculate position information of the cleaning apparatus 101 including a distance between the driving apparatus 10 and the cleaning apparatus 101 and a direction of the cleaning apparatus 101, based on the received position signal (s). When the cleaning apparatus 101 is moved, the controller 110 may update position information of the cleaning apparatus 101 in real time, and control the driver 160 so that the driving apparatus 10 moves along the cleaning apparatus 101. A detail description thereof will be described.

The image acquirer 150 may include an upper camera module 151 acquiring an image of an upper side of the cleaning robot 100 such as an image of a ceiling, and a front camera module 153 acquiring an image in the driving direction of the cleaning robot 100.

The upper camera module 151 may include an image sensor (not shown) provided on the upper surface of the cleaning robot 100 to acquire an image of the upper side of the cleaning robot 100 that is an image of the ceiling of the cleaning space.

The front camera module 153 may include an image sensor (not shown) provided on the front surface of the cleaning robot 100 to acquire images in the driving direction of the cleaning robot 100.

The image sensor contained in the upper camera module 151 and the front camera module 153 may employ Complementary Metal Oxide Semiconductor (CMOS) sensor, or Charge Coupled Device (CCD) sensor.

The image acquirer 150 may output an image acquired by the upper camera module 151 and the front camera module 153, to the controller 110.

The controller 110 may identify a position of the cleaning robot 100 based on the image acquired by the upper camera module 151 and the front camera module 153. Particularly, the controller 110 may acquire feature points from the image acquired by the upper camera module 151 and the front camera module 153, and calculate a moving distance, a moving direction, and a moving speed of the cleaning robot 100 based on position variation of the acquired feature points. In addition, the controller 110 may identify a position of the cleaning robot 100 based on the moving distance, moving direction, and moving speed of the cleaning robot 100.

The driver 160 may move the cleaning robot 100, and may include a wheel driving motor 161 and the driving wheel 163.

The driving wheel 163 may be provided opposite ends of the bottom surface of the driving apparatus 10, and may include a left driving wheel 163a provided in the left side of the cleaning robot 100 with respect to a front side of the cleaning robot 100, and a right driving wheel 163b provided in the right side of the cleaning robot 100 with respect to the front side of the cleaning robot 100, as illustrated in FIG. 3.

The driving wheel 163 may move the cleaning robot 100 by receiving a rotational force from the wheel driving motor 161.

The wheel driving motor 161 may generate a rotational force configured to rotate the driving wheel 163, and may include a left driving motor (not shown) rotating the left driving wheel 163a, and a right driving motor (not shown) rotating the right driving wheel 163b.

The left driving motor and the right driving motor may be operated independently of each other by receiving a driving control signal from the controller 110.

The left driving wheel 163a and the right driving wheel 163b may rotate independently of each other by the left driving motor and the right driving motor, which are independently of each other.

In addition, since the left driving wheel 163a and the right driving wheel 163b rotate independently of each other, the cleaning robot 100 may perform a variety of driving, e.g. driving forward and backward, a rotational driving, and a spinning.

For example, when both of the left and right driving wheel 163a and 163b rotates in a first direction, the cleaning robot 100 may perform a linear driving in a front side (driving forward) and when both of the left and right driving wheel 163a and 163b rotates in a second direction, the cleaning robot 100 may perform a linear driving in a rear side (driving backward)

When the left and right driving wheel 163a and 163b rotates in the same direction at a different speed, the cleaning robot 100 may rotationally drive in the right side or the left side, and when the left and right driving wheel 163a and 163b rotates in a different direction, the cleaning robot 100 may rotate clockwise or counterclockwise in a its place.

In addition, the driver 160 may further include a motor driving circuit (not shown) supplying a driving current to the driving wheel 163 according to a control signal of the controller 110, a power transmission module (not shown) transmitting the rotational force of the wheel driving motor 161 to the driving wheel 163, and a rotation detecting sensor (not shown) detecting a rotational displacement and a rotational speed of the wheel driving motor 161 or the driving wheel 163.

According to an embodiment of FIG. 4, the driving apparatus 10 may include the driving apparatus battery 194 supplying power needed for the moving of the driving apparatus 10. The cleaning apparatus 101 may include the cleaning apparatus battery 105 supplying power needed for operating of the dust suction motor. The cleaning apparatus battery 105 may be implemented as a battery pack configured by connecting battery cells in series or in parallel. In consideration of the current used by the dust suction motor, the cleaning apparatus battery 105 may be configured to supply power having a high voltage that is equal to or greater than a preselected level. In the same manner, the driving apparatus battery 194 may be implemented as a battery pack configured by connecting battery cells in series or in parallel. In consideration of the current used by the wheel driving motor, the driving apparatus battery 194 may be configured to supply power having a high voltage that is higher equal to or greater than a preselected level. For example, both the cleaning apparatus battery 105 and the driving apparatus battery 194 may be implemented as a battery pack of 21.6 V, in which six battery cells of 3.6 V are connected in series. According to an embodiment of FIG. 4, the driving apparatus 10 may include the driving apparatus battery 194 configured to supply amount of power that is supplied by the cleaning apparatus battery 105. Therefore, the driving apparatus 10 may receive amount of power from the driving apparatus battery 194 as much as the cleaning apparatus battery 105 even when power is not supplied from the cleaning apparatus battery 105 since the cleaning apparatus 101 is separated.

Therefore, although the cleaning apparatus 101 is separated, the driving apparatus 10 may store data related to an operation currently performed and identify a position of the cleaning apparatus 101 so as to move along the cleaning apparatus 101 by receiving power from the driving apparatus battery 194. When the cleaning apparatus 101 is mounted to the driving apparatus 10, the cleaning robot 100 may perform cleaning by receiving power from any one of the cleaning apparatus battery 105 and the driving apparatus battery 194.

Meanwhile, FIG. 5 illustrates an embodiment different from FIG. 4. A configuration according to an embodiment of FIG. 5 may be the same as FIG. 4 except for the battery configuration of the driving apparatus 10. In FIG. 5, a battery of the cleaning apparatus 101 is named as a main battery 105, but the function of the main battery 105 is the same as the cleaning apparatus battery 105 of FIG. 4.

According to an embodiment of FIG. 5, the driving apparatus 10 may include a battery module 195 having an auxiliary battery 196 and a voltage regulator such as a power supply circuit 197, regulating a voltage of power supplied from the auxiliary battery. The auxiliary battery 196 of the driving apparatus 10 may be configured to supply power having a voltage lower than the driving apparatus battery 194 of FIG. 4. According to an embodiment of FIG. 5, the main battery 105 provided in the cleaning apparatus 101, may supply power for cleaning of the cleaning robot 100 when the cleaning apparatus 101 is mounted to the driving apparatus 10. When the driving apparatus 10 does not receive power from the main battery 105 since the cleaning apparatus 101 is separated from the driving apparatus 10, the auxiliary battery 196 may supply power. According to an embodiment of FIG. 5, the auxiliary battery 196 may be provided to prevent data loss due to the power failure caused by the separation of the cleaning apparatus 101, wherein the data is related to an operation being performed and includes cleaning data including a cleaning history, a position of the driving apparatus 10, and a position of the charging station (cs). Therefore, the auxiliary battery 196 may be configured to supply a voltage of 3 to 5V in accordance with the above-mentioned purpose. For example, the auxiliary battery 196 may be implemented as one battery cell of 3.6V. Upon the separation of the cleaning apparatus 101, the controller 110 of the driving apparatus 10 may store data related to an operation, which is being performed, in the memory or the storage by receiving power from the auxiliary battery 196. As mentioned above, upon the separation of the cleaning apparatus 101, the driving apparatus 10 may store the data related to an operation being performed but may not move along the cleaning apparatus 101 since the auxiliary battery 196 of FIG. 5 supplies power having a voltage lower than that of the power of the driving apparatus battery 194. When the cleaning apparatus 101 is re-mounted to the driving apparatus 10, the controller 110 may continue the cleaning that is stopped, by controlling the cleaning apparatus 101, the cleaner 170 and the driver 160. Therefore, embodiments, described later, related to the movement of the driving apparatus 10 after the separation of the cleaning apparatus 101 may be applied to the cleaning robot 100 according to an embodiment of FIG. 4.

Upon charging the auxiliary battery 196, the power supply circuit 197 of the battery module 195 may regulate supplied power to have a voltage appropriate for the auxiliary battery 196. For example, the power supply circuit 197 converts the supply voltage into a voltage of 5 V and supplies the voltage to the auxiliary battery 196. An example of charging the cleaning robot 100 according to an embodiment of FIG. 5 will be described in detail with reference to FIGS. 6 to 8. FIG. 6 is a view illustrating an example in which the battery of the cleaning apparatus 101 and the battery of the driving apparatus 10 are charged during the cleaning robot 100 is charged according to an embodiment, and FIG. 7 is a view illustrating an example in which power is supplied from the battery of the driving apparatus 10 when the cleaning apparatus 10 of the cleaning robot 100 is separated according to an embodiment. FIG. 8 is a view illustrating an example in which the battery of the driving apparatus 10 is charged when the cleaning apparatus 101 is mounted to the driving apparatus 10 of the cleaning robot 100 according to an embodiment.

As illustrated in FIG. 6, when the cleaning robot 100 is charged by being mounted to the charging station (cs), the main battery 105 may be directly charged by the charging station (cs). However, without directly being charged by the charging station (cs), the auxiliary battery 196 may receive a power P1, which is supplied from the main battery 105 and then its voltage is regulated by passing through the power supply circuit 197. As mentioned above, since the voltage of the auxiliary battery 196 is lower than the voltage of the main battery 105, the auxiliary battery 196 may receive power having the voltage regulated by the power supply circuit 197. During charging, the controller 110 may perform an operation such as storing the needed data, by receiving the power P1 its voltage is regulated by passing through the power supply circuit 197.

As illustrated in FIG. 7, when the cleaning apparatus 101 is separated from the driving apparatus 10, the driving apparatus 10 may not receive power from the main battery 105. When the cleaning apparatus 101 is separated from the driving apparatus 10, the controller 110 may receive power from the auxiliary battery 196 and store data related to an operation, which is stopped upon the separation of the cleaning apparatus 101. For example, when the cleaning apparatus 101 is separated during the cleaning robot 100 performs cleaning, the controller 110 may receive power from the auxiliary battery 196 and store the cleaning history. In addition, when the cleaning apparatus 101 is separated at a particular position, the controller 110 may receive power from the auxiliary battery 196 and store the corresponding position. When the cleaning apparatus 101 is re-mounted to the driving apparatus 10, the controller 110 may continue the stopped cleaning based on the stored cleaning history. Further, when a position of the cleaning apparatus 101 upon re-mounting is not the stored particular position, the controller 110 may move the cleaning robot 100 to the stored particular position.

As illustrated in FIG. 8, when the cleaning apparatus 101 is mounted to the driving apparatus 10, the auxiliary battery 196 may be charged by receiving power from the main battery 105. In other words, when the cleaning apparatus 101 is re-mounted after being separated, the auxiliary battery 196 may be charged by receiving the power P1 which is supplied from the main battery 105 and then its voltage is regulated by passing through the power supply circuit 197. That is, as illustrated in FIG. 6, the auxiliary battery 196 may be charged when the cleaning robot is connected to the charging station (cs) in a state in which the cleaning apparatus 101 is mounted to the driving apparatus 10. Alternatively, as illustrated in FIG. 8, the auxiliary battery 196 may be charged by receiving power from the main battery 105 although the cleaning robot 100 is not connected to the charging station (cs).

The remaining configuration of the cleaning robot 100 will be described with reference to FIG. 4 again. The cleaner 170 may include a drum brush 173 scattering a dust on the cleaning floor, a brush driving motor 171 rotating the drum brush 173, a dust suction fan 104 suctioning the scattered dust, and a dust suction motor 175 rotating the dust suction fan 104.

The drum brush 173 may be provided in a dust inlet 172 formed in the bottom surface of the driving apparatus 10. The drum brush 173 may scatter dust on the cleaning floor to the inside of the dust inlet 172 while rotating with respect to a rotational shaft provided on a level with the bottom of the driving apparatus 10.

The brush driving motor 171 may be provided adjacent to the drum brush 173 to rotate the drum brush 173 according to a cleaning control signal of the controller 110.

Although not shown in the drawings, the cleaner 170 may further include a motor driving circuit (not shown) supplying a driving current to the brush driving motor 171 according to a control signal of the controller 110, and a power transmission module (not shown) transmitting the rotational force of the brush driving motor 171 to the drum brush 173. The driving apparatus 10 may include the above mentioned the drum brush and brush driving motor to assistant the cleaning apparatus 101 to suction the dust, and a component generating the suction force for suctioning the dust may be provided in the cleaning apparatus 101.

The dust suction fan 177 provided in the cleaning apparatus 101 may suction dust that is scattered by the drum brush 173.

The dust suction motor 175 may be provided adjacent to the dust suction fan 177 and configured to rotate the dust suction fan 177 according to a control signal of the controller 110.

Although not shown in the drawings, the cleaning apparatus 101 may further include a motor driving circuit (not shown) supplying a driving current to the dust suction motor 175 according to a control signal of the controller 110, and a power transmission module (not shown) transmitting the rotational force of the dust suction motor 175 to the dust suction fan 177. Upon being mounted to the driving apparatus 10, the cleaning apparatus 101 may generate the suction force under the control of the controller 110 of the driving apparatus 10. Alternatively, although not shown, by having a controller, the cleaning apparatus 101 may generate the suction force under control of the controller provided in the cleaning apparatus 101, in a state in which the cleaning apparatus 101 is mounted to the driving apparatus 10. Further, when the cleaning apparatus 101 is separated from the driving apparatus 10, the cleaning apparatus 101 may generate the suction force under the control of the controller provided in the cleaning apparatus 101. The configuration of the controller of the cleaning apparatus is the same as the controller 110 of the driving apparatus 10, and thus a description of the controller of the cleaning apparatus is replaced by the description of the controller 110 of the driving apparatus 10.

The storage 180 may store control programs and control data for controlling the cleaning robot 100 and various application programs and application data that perform various functions according to user inputs.

For example, the storage 180 may store an operation system (OS) program managing components contained in the cleaning robot 100 and sources (software and hardware), an image processing program processing a reflection light image acquired by the obstacle detector 140, and a motor control program controlling the motor of the driver 160, the motor of the cleaner 170 and the motor of the cleaning apparatus 101.

In addition, the storage 180 may operate as an auxiliary storage device of the memory 115, which will be described below. In particularly, the storage 180 may store map data indicating of a map of the cleaning space generated before the first driving of the cleaning robot 100.

The map of the cleaning space may include a topological map including a connection among a plurality of cleaning regions contained in the cleaning space, a metric map, a grid map or a geometry map indicating a shape of the cleaning space and a position of obstacles.

The grid map and the topological map may be generated before the cleaning robot 100 moves in the cleaning space for the first time, and may be stored in the storage. In addition, the cleaning robot 100 may update the topological map and the grid map stored in the storage 180 during the cleaning robot 100 moves in the cleaning space.

The storage 180 may include a nonvolatile memory in which a program or data is not lost even when the power is turned off. For example, the storage 180 may include is Hard disk drive 181 or a solid state drive 183.

The communicator 190 may exchanges data with an external device such as an access point (AP) that relays wireless communication, a user terminal capable of mobile communication and other home appliances.

The communicator 190 may include various communication modules 191 and 193 and an antenna (not shown) according to a communication protocol. For example, the communicator 190 is a Bluetooth (Bluetooth™) communication module 191, or Wi-Fi (Wi-Fi™) communication module 193 forming a local area network, or used to connect to a wide area network.

Through the communicator 190, the cleaning robot 100 may receive map data from an external device or may transmit map data to an external device.

The controller 110 may control components contained in the cleaning robot 100.

The controller 110 may include an input/output interface 117 mediating an input and output of data between the controller 110 and components contained in the cleaning robot 100, a memory 115 memorizing programs and data; a graphic processor 113 performing an image processing, and a main processor 111 performing an arithmetic operation according to the program and data memorized in the memory 113. The controller 110 may further include a data bus 119 mediating data transmission and reception among the input/output interface 117, the memory 115, the graphic processor 113 and the main processor 111.

The input/output interface 117 may receive a user command received through the user interface 120, motion information of the cleaning robot 100 acquired by the motion detector 130, and an obstacle identified by the obstacle detector 140, and transmit the information to the main processor 111, the graphic processor 113 and the memory 115 through the data bus 119.

In addition, the input/output interface 117 may transmit a variety of control signals output by the main processor 111 to the user interface 120, the driver 160, the cleaner 170 or the cleaning apparatus 101.

The memory 115 may temporarily memorize control programs and control data, which is to control an operation of the cleaning robot 100, the user command received through the user interface 120, the motion information of the cleaning robot 100 acquired by the motion detector 130, and position information of the obstacle acquired by the obstacle detector 140, position information of the cleaning apparatus 101 acquired by the position detector 146, and a variety of control signals output by the main processor 111.

The memory 115 may include a volatile memory, e.g. S-RAM, and D-RAM, but is not limited thereto. Therefore, the memory 115 may include a nonvolatile memory, e.g. flash memory, Read Only Memory (RAM), Erasable Programmable Read Only Memory (EPROM), and Electrically Erasable Programmable Read Only Memory (EEPROM).

Particularly, the non-volatile memory may store control programs and control data for controlling an operation of the cleaning robot 100. The volatile memory may load the control programs and control data from the non-volatile memory and memorize it or memorize the user command received through the user interface 120, the motion information of the cleaning robot 100 acquired by the motion detector 130, the obstacle position information acquired by the obstacle detector 140, and the variety of control signals output by the main processor 111.

The graphic processor 113 may convert a reflection light image acquired by the obstacle detector 140 into an image having a resolution that is processable by the main processor 111 or convert a reflection light image into a format that is processable by the main processor 111.

The main processor 111 may process the data stored in the memory 115 in accordance with the control program stored in the memory 115.

For example, the main processor 111 may process an output signal of the motion detector 130, the position detector 146, and the obstacle detector 140, and generate a control signal controlling the driver 160, the cleaner 170 or the cleaning apparatus 101.

The main processor 111 may generate a driving record based on the motion information of the cleaning robot 100 acquired by the motion detector 130, and store the generated driving record in the memory 115. In addition, the main processor 111 may update the map data stored in the storage 180, based on the driving record.

The main processor 111 may calculate a direction, distance and size of the obstacle based on the reflection light image acquired by the obstacle detector 140. The main processor 111 may calculate a driving route to avoid an obstacle, based on the direction, the distance and the size of the obstacle, and generate a driving control signal that is to be provided to the driver 160 to move the cleaning robot 100 along the calculated driving route.

The controller 110 may identify a position and movement of the cleaning robot 100 based on the output signal of the motion detector 130, and identify the position and movement of the obstacle based on the output signal of the obstacle detector 140.

The controller 110 may control the driver 160 so that the cleaning robot 100 moves on the cleaning floor and control the cleaner 170 and the cleaning apparatus 101 so that the cleaning robot 100 cleans the cleaning floor during the cleaning robot 100 moves.

Hereinafter a method of moving the driving apparatus 10 when the cleaning apparatus 101 is separated from the driving apparatus 10 in the cleaning robot 100 according to the above mentioned embodiment of FIG. 4, will be described.

FIG. 9 is a view illustrating an example in which the cleaning apparatus 101 of the cleaning robot 100 calls the driving apparatus 10 according to an embodiment, and FIG. 10 is a view illustrating an example in which the driving apparatus 10 of the cleaning robot 100 moves along the cleaning apparatus 101 according to an embodiment. FIG. 11 is a view illustrating an example in which the driving apparatus 10 moves when the cleaning apparatus 101 of the cleaning robot 100 is mounted to the driving apparatus according to an embodiment. FIG. 12 is a view illustrating an example in which the driving apparatus 10 moves when the cleaning apparatus 101 is separated during the cleaning robot 100 is charged according to an embodiment, and FIG. 13 is a view illustrating an example in which the driving apparatus 10 moves when the cleaning apparatus 101 of the cleaning robot 100 is mounted to the driving apparatus according to an embodiment.

As illustrated in FIG. 9A, when the cleaning apparatus 101 is separated from the driving apparatus 10, the cleaning apparatus 101 may output the call signal (c) to move the driving apparatus 10 to the position of the cleaning apparatus 101. As mentioned above, the user interface of the cleaning apparatus 101 may include the call button configured to receive a call command for calling the driving apparatus 10 to a position in which the cleaning apparatus 101 is placed, in a state in which the cleaning apparatus 101 is separated. When the call button is operated in response to a pre-selected call command, such as pressing the call button by the user, the cleaning apparatus 101 may output the call signal (c) to the driving apparatus 10. The call signal (c) may be output from the position signal transmitter 102 of the cleaning apparatus 101 and received by the position detector 146 or the obstacle detector 140 of the driving apparatus 10.

When the position detector 146 of the driving apparatus 10 receives the call signal (c), the controller 110 may identify a position of the cleaning apparatus 101 based on the received call signal (c). That is, the controller 110 may calculate a distance between the driving apparatus 10 and the cleaning apparatus 101, and a moving direction of the driving apparatus 10 that allows the driving apparatus 10 to reach the position of the cleaning apparatus 101. Based on the calculated information, the controller 110 may control the driver 160 to move the driving apparatus 10 to the cleaning apparatus 101 side, as illustrated in FIG. 9B.

In a state in which the controller 110 moves the driving apparatus 10 to the cleaning apparatus 101 side, the controller 110 may stop the movement of the driving apparatus 10 when the driving apparatus 10 reaches a preselected reference distance from the cleaning apparatus 101. When the driver 160 is controlled so that the driving apparatus 10 precisely reaches the position of the cleaning apparatus 101, it may lead to the collision between the driving apparatus 10 and the cleaning apparatus 101. Therefore, the controller 110 may control the driver 160 such that the driving apparatus 10 reaches the vicinity of the cleaning apparatus 101. In addition, since the cleaning apparatus 101 calls the driving apparatus 10 to be placed in a position in which the cleaning apparatus 101 is easily mounted, it may be not required that the driving apparatus 10 more moves to the cleaning apparatus 101 side when the driving apparatus 10 reaches the position in which the cleaning apparatus 101 is easily mounted, that is the driving apparatus 10 reaches the preselected reference distance. Therefore, the preselected reference distance may represent a distance that allows the cleaning apparatus 101 to be easily mounted to the driving apparatus 10 without further movement by a user, and may be pre-selected and then stored.

As mentioned above, the driving apparatus 10 may be called by the operation of the call button or alternatively, the driving apparatus 10 may be called by an operation of a communication device such as a mobile phone. An application having the call function of the driving apparatus 10 may be installed in the mobile phone and thus the call function may be implemented through the application. When the call command is output by operating the call function of the application by a user, the communicator 190 of the driving apparatus 10 may receive the call command output from the mobile phone. At this time, the mobile phone and the driving apparatus 10 may perform the communication through the Bluetooth method or the Wi-Fi method. Upon receiving the call command, the driving apparatus 10 may search for a position of the cleaning apparatus 101 by using the obstacle detector or the image acquirer. When the position of the cleaning apparatus 101 is identified through the position search of the cleaning apparatus 101, the controller 110 may control the driver 160 to move the driving apparatus 10 to the position of the cleaning apparatus 101.

Alternatively, when the call command is output by operating the call function of the application by the user, the cleaning apparatus 101 may receive the call command output from the mobile phone. In this case, the cleaning apparatus 101 may include a communicator to communicate with the mobile phone, in the same manner as the cleaning apparatus 101. Upon receiving the call command, the cleaning apparatus 101 may output the call signal (c) toward the driving apparatus 10 to move the driving apparatus 10 toward the position of the driving apparatus 10, as mentioned above. A description thereof is the same as the movement of the driving apparatus 10 by the call command through the operation of the call button, as mentioned above, and thus it will be omitted.

In addition, by inputting the call command through the mobile phone in a state in which the cleaning apparatus 101 is mounted to the driving apparatus 10, it may be possible to move the cleaning robot 100 to a position of the user. In this case, when the driving apparatus 10 receives the call signal (c) from the mobile phone, the cleaning robot 100 may search for a position to which the call signal (c) is emitted, and move to the position of the user. Calling the cleaning robot 100 to the position of the user may be implemented by an operation of remote controller configured to remotely receive a variety of operation commands, as well as the mobile phone.

As illustrated in FIG. 9, by calling the driving apparatus 10 to the cleaning apparatus 101, the driving apparatus 10 may move to the cleaning apparatus 101 side, as illustrated in FIG. 9. Alternatively, without calling, the driving apparatus 10 may move along the cleaning apparatus 101, as illustrated in FIG. 10.

The cleaning apparatus 101 may be separated from the driving apparatus 10 during the cleaning robot 100 performs the cleaning, as illustrated in FIG. 10A. When the cleaning apparatus 101 is moved as illustrated in FIG. 10B, the driving apparatus 10 may move to a position to which the cleaning apparatus 101 is moved, as illustrated in FIG. 10C. In addition, when the cleaning apparatus 101 is moved to other position, as illustrated in FIG. 10D, the driving apparatus 10 may move to a position to which the cleaning apparatus 101 is moved, as illustrated in FIG. 10E.

For example, when a user performs the cleaning in a desired location after separating the cleaning apparatus 101 from the driving apparatus 10 during the cleaning robot 100 performs the cleaning, the driving apparatus 10 may move to the position to which the cleaning apparatus 101 is moved. Particularly, when the cleaning apparatus 101 is separated, the controller 110 of the driving apparatus 10 may store a cleaning history currently performed. That is, the controller 110 may store a cleaning performance route and a position in which the cleaning is stopped. By storing the cleaning history, the controller 110 may allow the cleaning apparatus 101 to continue the stopped cleaning when the cleaning apparatus 101 is re-mounted. When the cleaning apparatus 101 is moved, the position signal transmitter 102 of the cleaning apparatus 101 may output the position signal (s) indicating the position of the cleaning apparatus 101 and the position detector 146 of the driving apparatus 10 may receive the position signal (s). The position signal transmitter 102 of the cleaning apparatus 101 may be controlled to automatically transmit the position signal (s) when the cleaning apparatus 101 is separated from the driving apparatus 10. Based on the received position signal (s), the controller 110 may calculate a distance between the driving apparatus 10 and the cleaning apparatus 101, and a moving direction of the driving apparatus 10 that allows the driving apparatus 10 to reach the position of the cleaning apparatus 101. The process may be performed every movement of the cleaning apparatus 101 and may be updated in real time. Based on the calculated information, the controller 110 may control the driver 160 to move the driving apparatus 10 to the cleaning apparatus 101 side, as illustrated in FIGS. 10C and 10E. Since the driving apparatus 10 moves along the cleaning apparatus 101, the user may immediately mount the cleaning apparatus 101 to the driving apparatus 10, which moves around the cleaning apparatus 101, without moving the cleaning apparatus 101 to the position of the driving apparatus 10 to mount the cleaning apparatus 101 to the driving apparatus 10. Therefore, it may be possible to reduce the inconvenience that the user goes to the driving apparatus 10 to re-mount the cleaning apparatus 101.

When the distance between the driving apparatus 10 and the cleaning apparatus 101 is equal to or greater than a preselected reference distance, the controller 110 may move the driving apparatus 10. As mentioned above, since the driving apparatus 10 moves to be placed in a position, which allows the cleaning apparatus 101 to be easily re-mounted, it may be not required that the driving apparatus 10 more moves to the cleaning apparatus 101 side when the driving apparatus 10 is placed in the position in which the cleaning apparatus 101 is easily mounted, that is the driving apparatus 10 reaches within the preselected reference distance. Therefore, the preselected reference distance may represent a distance that allows the cleaning apparatus 101 to be easily mounted to the driving apparatus 10 without further movement by a user, and may be pre-selected and then stored.

As illustrated in FIG. 11A, when the cleaning apparatus 101 is mounted to the driving apparatus 10, the cleaning robot 100 may automatically move to the position (P1) in which the cleaning apparatus 101 is separated. As mentioned above, when the cleaning apparatus 101 is separated, the controller 110 may store the position of the driving apparatus 10 upon the separation, and data related to the operation being performed. For example, when the cleaning apparatus performs the cleaning, the controller 110 may store a cleaning history. When the cleaning apparatus 101 is re-mounted to the driving apparatus 10, the controller 110 may move the cleaning robot 100 to the stored position by controlling the driver 160. When the cleaning robot 100 moves to the stored position, the controller 110 may allow the cleaning robot 100 to continue the stopped cleaning by controlling the cleaning apparatus 101, the cleaner 170 and the driver 160.

When the cleaning apparatus 101 is separated from the driving apparatus 10 and the cleaning apparatus 101 is moved as illustrated in FIG. 12B, in a state in which the cleaning robot 100 is connected to the charging station (cs) as illustrated in FIG. 12A, the driving apparatus 10 may move to the position to which the cleaning apparatus 101 is moved as illustrated in FIG. 12C. In addition, when the cleaning apparatus 101 is moved to other position as illustrated in FIG. 12D, the driving apparatus 10 may move to the position to which the cleaning apparatus 101 is moved as illustrated in FIG. 12E.

For example, when a user performs the cleaning in a desired location after separating the cleaning apparatus 101 from the driving apparatus 10 during the cleaning robot 100 is charged, the driving apparatus 10 may move to the position to which the cleaning apparatus 101 is moved. Particularly, when the cleaning apparatus 101 is separated during charging, the controller 110 of the driving apparatus 10 may store information that the cleaning apparatus 101 is charged. That is, the controller 110 may store the position (P1) in which the driving apparatus 10 is connected to the charging station (cs) to be charged. By storing a fact that the cleaning robot 100 is being charged, the controller 110 may allow the cleaning robot 100 to continue the stopped cleaning when the cleaning apparatus 101 is re-mounted. The embodiment of FIG. 12 is different from the embodiment of FIG. 10 in that the cleaning apparatus 101 is separated upon charging of the cleaning robot 100, but the embodiment of FIG. 12 is the same as the embodiment of FIG. 10 in that the driving apparatus 10 moves along the cleaning robot 100 after the cleaning apparatus 101 is separated. Therefore, a detail description of the movement of the driving apparatus 10 is the same as FIG. 10 and thus it will be omitted.

As illustrated in FIG. 13A, when the cleaning apparatus 101 is mounted to the driving apparatus 10, the cleaning robot 100 may automatically move to the position (P1) to which the cleaning apparatus 101 is separated, that is the cleaning robot 100 may automatically move to the charging position. As mentioned above, the controller 110 may store the charging position of the cleaning robot 100 when the cleaning apparatus 101 is separated during the cleaning robot 100 is charged. Therefore, the controller 110 may move the cleaning robot 100 to the stored charging position by controlling the driver 160 so that the stopped charging is performed when the cleaning apparatus 101 is mounted to the driving apparatus 10.

FIGS. 14 to 16 are a flowchart illustrating a controlling method of the cleaning robot 100 according to an embodiment. A controlling method of the cleaning robot 100 for movement of the driving apparatus 10 will be described with reference to FIGS. 14 to 16.

As illustrated in FIG. 14, after the cleaning apparatus 101 is separated from the driving apparatus 10 (800), the call signal (c) may be output from the cleaning apparatus 101 (810) and then the driving apparatus 10 may receive the call signal (c) (820). Therefore, the controller 110 may identify a position of the cleaning apparatus 101 based on the call signal (c) (830). The controller 110 may move the driving apparatus 10 to the identified position by controlling the driver 160 (840).

When the user operates the call button provided in the cleaning apparatus 101 after the cleaning apparatus 101 is separated, the cleaning apparatus 101 may output the call signal (c) to the driving apparatus 10. When the position detector 146 of the driving apparatus 10 receives the call signal (c), the controller 110 may identify a position of the cleaning apparatus 101, based on the received call signal (c). That is, the controller 110 may calculate a distance between the driving apparatus 10 and the cleaning apparatus 101, and a moving direction of the driving apparatus 10 that allows the driving apparatus 10 to reach the position of the cleaning apparatus 101. Based on the calculated information, the controller 110 may control the driver 160 to move the driving apparatus 10 to the cleaning apparatus 101 side, as illustrated in FIG. 9B.

As illustrated in FIG. 15, when the cleaning apparatus 101 is separated from the driving apparatus 10 (905) during the cleaning robot 100 performs the cleaning (900), the controller 110 may store the position of the driving apparatus 10 and the cleaning history (910).

When the cleaning apparatus 101 is separated, the controller 110 of the driving apparatus 10 may store the cleaning history currently performed. That is, the controller 110 may store a cleaning performance route and a position in which the cleaning is stopped. By storing the cleaning history, the controller 110 may allow the cleaning apparatus 101 to continue the stopped cleaning when the cleaning apparatus 101 is re-mounted.

When the position signal (s) is received from the cleaning apparatus 101 (915), the controller 110 may identify the position of the cleaning apparatus 101 based on the position signal (s) (920) and move the driving apparatus 10 to the identified position (925).

When the cleaning apparatus 101 is moved, the position signal transmitter 102 of the cleaning apparatus 101 may output the position signal (s) indicating the position of the cleaning apparatus 101 and the position detector 146 of the driving apparatus 10 may receive the position signal (s). Based on the received position signal (s), the controller 110 may calculate a distance between the driving apparatus 10 and the cleaning apparatus 101, and a moving direction of the driving apparatus 10 that allows the driving apparatus 10 to reach the position of the cleaning apparatus 101. The process may be performed every movement of the cleaning apparatus 101 and may be updated in real time. Based on the calculated information, the controller 110 may control the driver 160 to move the driving apparatus 10 to the cleaning apparatus 101 side, as illustrated in FIGS. 10C and 10E.

When the cleaning apparatus 101 is mounted (930), the controller 110 may move the cleaning robot 100 to the stored position (935) and may allow the cleaning robot 100 to continue the stopped cleaning based on the stored cleaning history (940).

When the cleaning apparatus 101 is mounted to the driving apparatus 10, the controller 110 may move the cleaning robot 100 to the stored position by controlling the driver 160. When the cleaning robot 100 moves to the stored position, the controller 110 may allow the cleaning robot 100 to continue the stopped cleaning by controlling the cleaning apparatus 101, the cleaner 170 and the driver 160.

As illustrated in FIG. 16, when the cleaning apparatus 101 is separated from the driving apparatus 10 (950) during the cleaning robot 100 is charged (945), the controller 110 may store the charging position (955).

When the cleaning apparatus 101 is separated, the controller 110 of the driving apparatus 10 may store the position (P1) in which the driving apparatus 10 is connected to the charging station (cs) to be charged. Accordingly, the controller 110 may allow the cleaning robot 100 to continue the stopped cleaning when the cleaning apparatus 101 is re-mounted.

When the position signal (s) is received from the cleaning apparatus 101 (960), the controller 110 may identify the position of the cleaning apparatus 101 based on the position signal (s) (965) and the controller 110 may move the driving apparatus 10 to the identified position (970). A description thereof is the same as FIG. 0.15 and thus it will be omitted.

When the cleaning apparatus 101 is mounted (975), the controller 110 may move the driving apparatus 10 to the stored charging position (980) and allow the charging of the cleaning robot 100 to be performed (985).

When the cleaning apparatus 101 is mounted to the driving apparatus 10, the controller 110 may move the cleaning robot 100 to the charging position by controlling the driver 160. When the cleaning robot 100 moves to the charging position and then is connected to the charging station (cs), the charging of the cleaning robot 100 may be re-started.

Although a few embodiments of the present disclosure have been shown and described, it would be appreciated by those skilled in the art that changes may be made in these embodiments without departing from the principles and spirit of the disclosure, the scope of which is defined in the claims and their equivalents.

INDUSTRIAL APPLICABILITY

The above-described cleaning robot and its control method can be used in various fields such as a home or an industrial field, and thus, there is a possibility of industrial use.

The invention claimed is:
1. A cleaning robot comprising:
a driving apparatus provided with a mounting groove configured to allow a cleaning apparatus to be removably mounted; and
the cleaning apparatus removably mounted to the mounting groove,
wherein, when the cleaning apparatus is separated from the mounting groove, the driving apparatus stores a position of the driving apparatus upon a separation of the cleaning apparatus, identifies a position of the cleaning apparatus, and when the cleaning apparatus is mounted to the mounting groove, the driving apparatus moves to the stored position, and
wherein, when a distance between the cleaning apparatus and the driving apparatus is equal to or greater than a pre-selected distance, the driving apparatus moves along with the cleaning apparatus remaining proximate to the cleaning apparatus.

2. The cleaning robot of claim 1,
wherein, when the cleaning apparatus is separated from the mounting groove while the cleaning robot performs cleaning, the driving apparatus stores cleaning data up to a time of the separation of the cleaning apparatus, and
wherein, when the cleaning apparatus is mounted to the mounting groove, the driving apparatus continues the cleaning that was being performed, based on the stored cleaning data.

3. The cleaning robot of claim 1, wherein, when a call signal is transmitted from the cleaning apparatus separated from the mounting groove, the driving apparatus moves to a position of the cleaning apparatus by receiving the call signal.

4. The cleaning robot of claim 1,
wherein the cleaning apparatus comprises an inputter configured to receive a call command calling the driving apparatus to a position of the cleaning apparatus, and
wherein the cleaning apparatus transmits a call signal to the driving apparatus when the call command is received through the inputter.

5. The cleaning robot of claim 1, wherein, when the cleaning apparatus is mounted to the mounting groove after the cleaning apparatus is separated from the mounting groove while the cleaning robot is being charged, the driving apparatus moves to a position for charging and re-starts the charging.

6. The cleaning robot of claim 1, wherein the driving apparatus comprises:
a driving apparatus battery configured to supply power to allow the driving apparatus to move although the cleaning apparatus is separated from the driving apparatus;
a position detector configured to identify a position of the cleaning apparatus by receiving a position signal that is output from the cleaning apparatus when the cleaning apparatus is separated; and
a driving apparatus controller configured to control movement of the driving apparatus based on an identification result of the position detector.

7. The cleaning robot of claim 6,
wherein the controller stores a position of the driving apparatus upon the separation of the cleaning apparatus when the cleaning apparatus is separated from the mounting groove, and
wherein the controller moves the driving apparatus to the stored position when the cleaning apparatus is mounted to the mounting groove.

8. The cleaning robot of claim 6,
wherein the controller identifies the position of the cleaning apparatus based on the identification result of the position detector when the cleaning apparatus is separated from the mounting groove, and
wherein, when a distance between the cleaning apparatus and the driving apparatus is equal to or greater than a pre-selected distance, the controller moves the driving apparatus along with the cleaning apparatus remaining proximate to the cleaning apparatus.

9. The cleaning robot of claim 6,
wherein, when the cleaning apparatus is separated from the mounting groove while the cleaning robot performs cleaning, the controller stores cleaning data up to a time of the separation of the cleaning apparatus, and
wherein, when the cleaning apparatus is mounted to the mounting groove, the controller controls the cleaning robot to continue the cleaning that was being performed, based on the stored cleaning data.

10. The cleaning robot of claim 6, wherein, when the position detector receives a call signal transmitted from the cleaning apparatus separated from the mounting groove, the controller moves the driving apparatus to a position of the cleaning apparatus based on the received call signal.

11. The cleaning robot of claim 6, wherein, when the cleaning apparatus is mounted to the mounting groove after the cleaning apparatus is separated from the mounting groove while the cleaning robot is being charged, the controller moves the driving apparatus to a position for charging the driving apparatus, to allow the charging to re-start.

12. The cleaning robot of claim 1, wherein the cleaning apparatus comprises:
a position signal transmitter configured to transmit a position signal indicating a position of the cleaning apparatus when the cleaning apparatus is separated from the mounting groove; and
a battery configured to supply power for performing a cleaning function of the cleaning apparatus.

13. The cleaning robot of claim 1,
wherein the cleaning apparatus comprises a main battery configured to supply power for driving and cleaning of the cleaning robot, and
wherein the driving apparatus comprises an auxiliary battery configured to supply supplemental power to a memory storing the position of the driving apparatus although the cleaning apparatus is separated from the mounting groove and configured to supply power for storing cleaning data.

14. The cleaning robot of claim 13, wherein the driving apparatus comprises a voltage regulator configured to convert a voltage, which is supplied from the main battery when cleaning apparatus is mounted to the mounting groove, into a voltage for charging the auxiliary battery.

* * * * *